United States Patent
Kimura

(10) Patent No.: US 8,931,111 B2
(45) Date of Patent: Jan. 6, 2015

(54) OPTICAL WRITING APPARATUS, IMAGE FORMING APPARATUS AND COMPUTER READABLE INFORMATION RECORDING MEDIUM

(75) Inventor: Tomonori Kimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1820 days.

(21) Appl. No.: 12/171,317

(22) Filed: Jul. 11, 2008

(65) Prior Publication Data

US 2009/0025093 A1 Jan. 22, 2009

(30) Foreign Application Priority Data

Jul. 17, 2007 (JP) ................................. 2007-185715
Jul. 9, 2008 (JP) ................................. 2008-179525

(51) Int. Cl.
*G06F 7/04* (2006.01)
*G06F 17/30* (2006.01)
*H04N 7/16* (2011.01)
*H04N 1/44* (2006.01)
*H04N 1/00* (2006.01)

(52) U.S. Cl.
CPC ............. *H04N 1/44* (2013.01); *H04N 1/00838* (2013.01); *H04N 1/00846* (2013.01); *H04N 1/00864* (2013.01)

USPC ............................................... 726/32; 726/33

(58) Field of Classification Search
USPC ..................... 726/26, 31–33; 358/3.28, 1.14; 283/902; 399/366; 380/54–55
See application file for complete search history.

(56) References Cited

U.S. PATENT DOCUMENTS

| 5,647,010 A | 7/1997 | Okubo et al. | |
| 2001/0035889 A1* | 11/2001 | Mikami | 347/19 |
| 2004/0150859 A1* | 8/2004 | Hayashi | 358/3.28 |

FOREIGN PATENT DOCUMENTS

| JP | 07-273984 | 10/1995 |
| JP | 3078433 | 8/2000 |
| JP | 2004-237678 | 8/2004 |

* cited by examiner

*Primary Examiner* — Kambiz Zand
*Assistant Examiner* — Trong Nguyen
(74) *Attorney, Agent, or Firm* — IPUSA, PLLC

(57) ABSTRACT

An optical writing apparatus has a part configured to superpose an unauthorized copy protection pattern on image data; a control part configured to recognize the unauthorized copy protection pattern, correct image data of the unauthorized copy protection pattern in pixel unit, and control a size of an isolated dot included in the unauthorized copy protection pattern; and a writing part configured to write a corresponding image on a photosensitive body based on the thus-corrected image data.

21 Claims, 34 Drawing Sheets

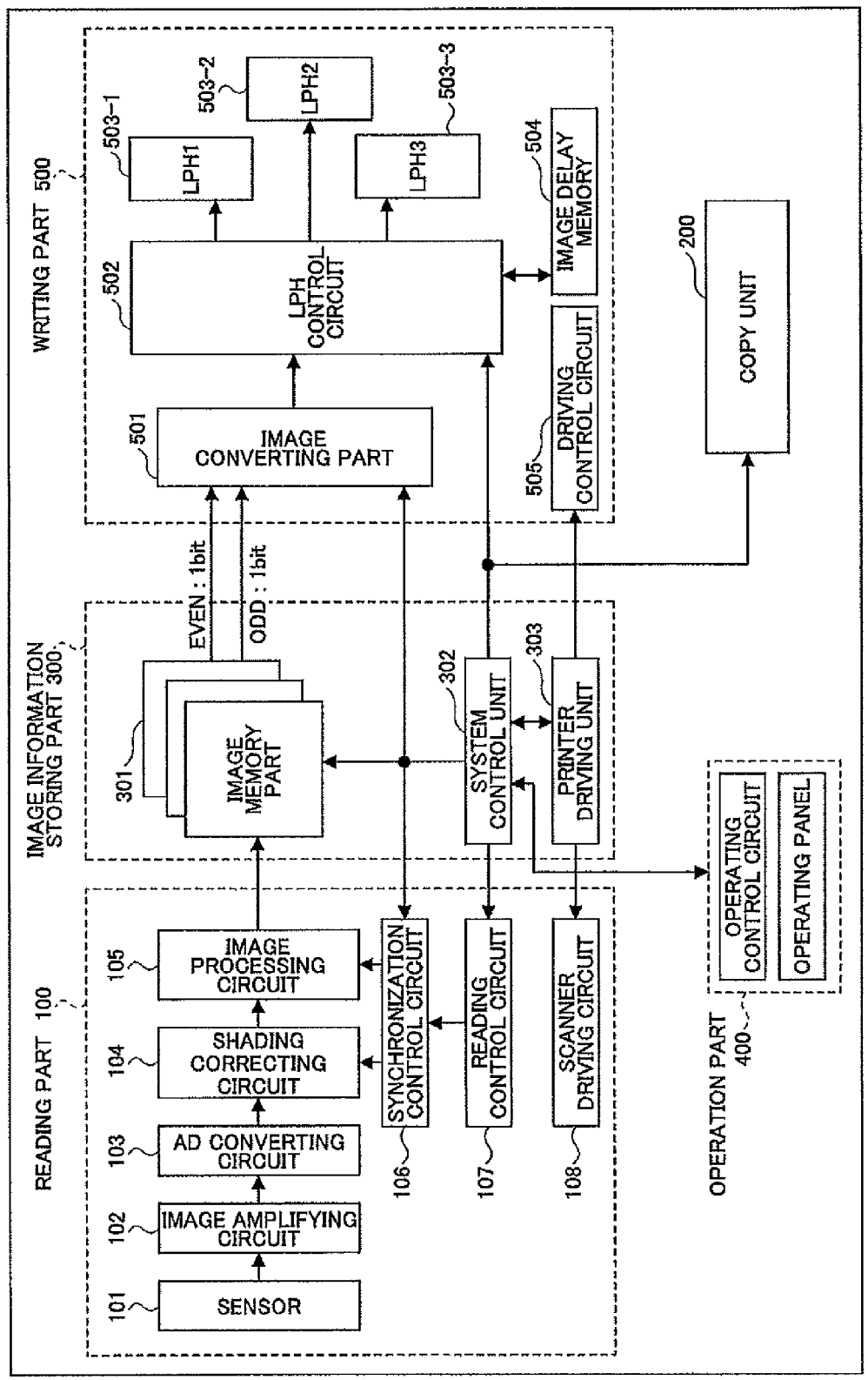

FIG.5

| DENSITY | MATRIX SIZE |
|---|---|
| 1,2,3 TIMES, NORMAL | 7×7 |
| 1.5 TIMES | 2×2  6×2  4×3 |
|  |  |

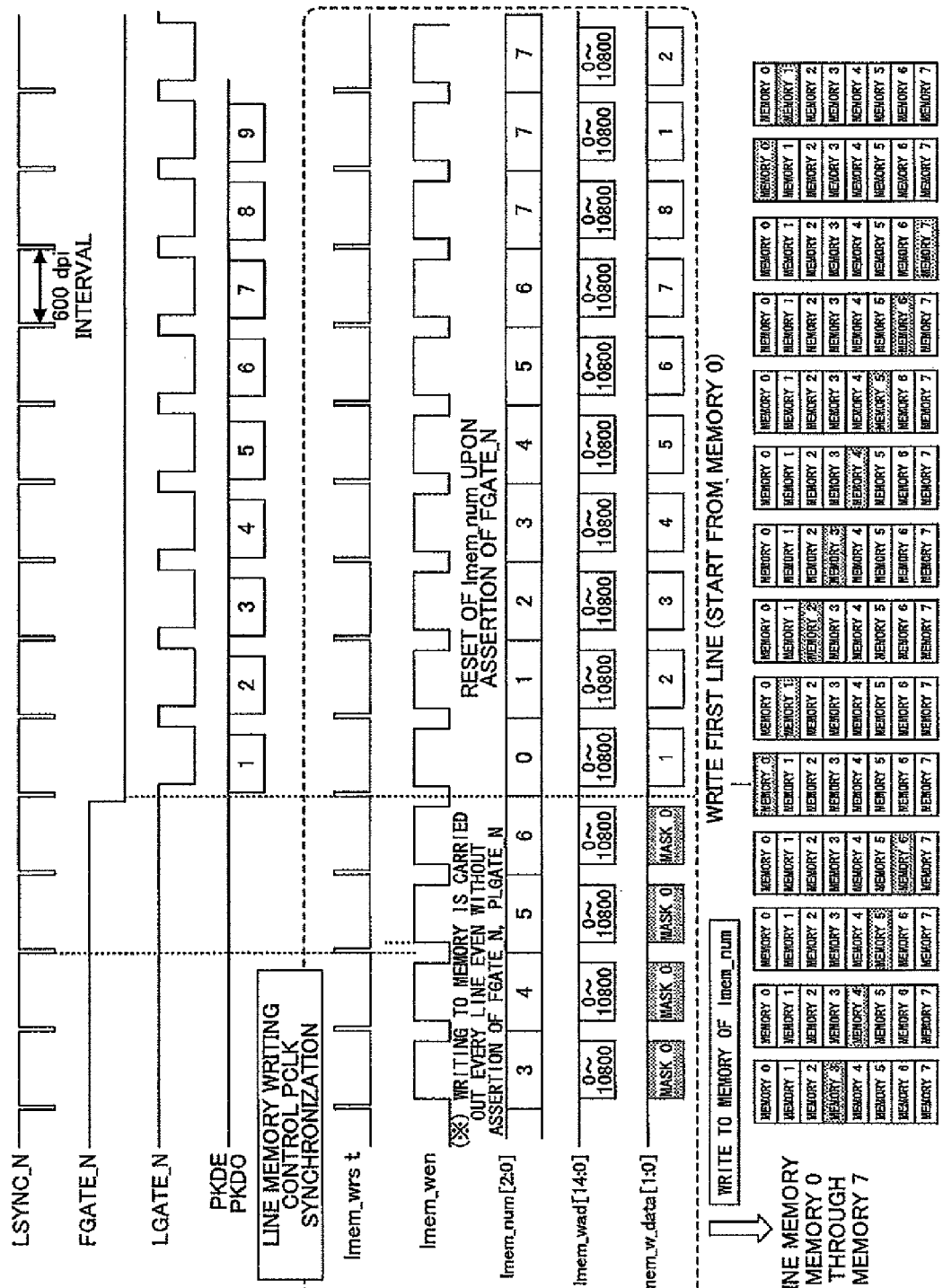

FIG.9

| VALUE OF hcopyset[1:0] | IMAGE STATE |
|---|---|
| 1 | UNAUTHORIZED COPY PROTECTION PATTERN CORRECTING CONTROL IS NOT CARRIED OUT. |
| 2 | UNAUTHORIZED COPY PROTECTION PATTERN CORRECTING CONTROL IS CARRIED OUT.<br><br>IMAGE DATA: BINARY |
| 3 | UNAUTHORIZED COPY PROTECTION PATTERN CORRECTING CONTROL IS CARRIED OUT.<br>IMAGE DATA: MULTI-LEVEL |

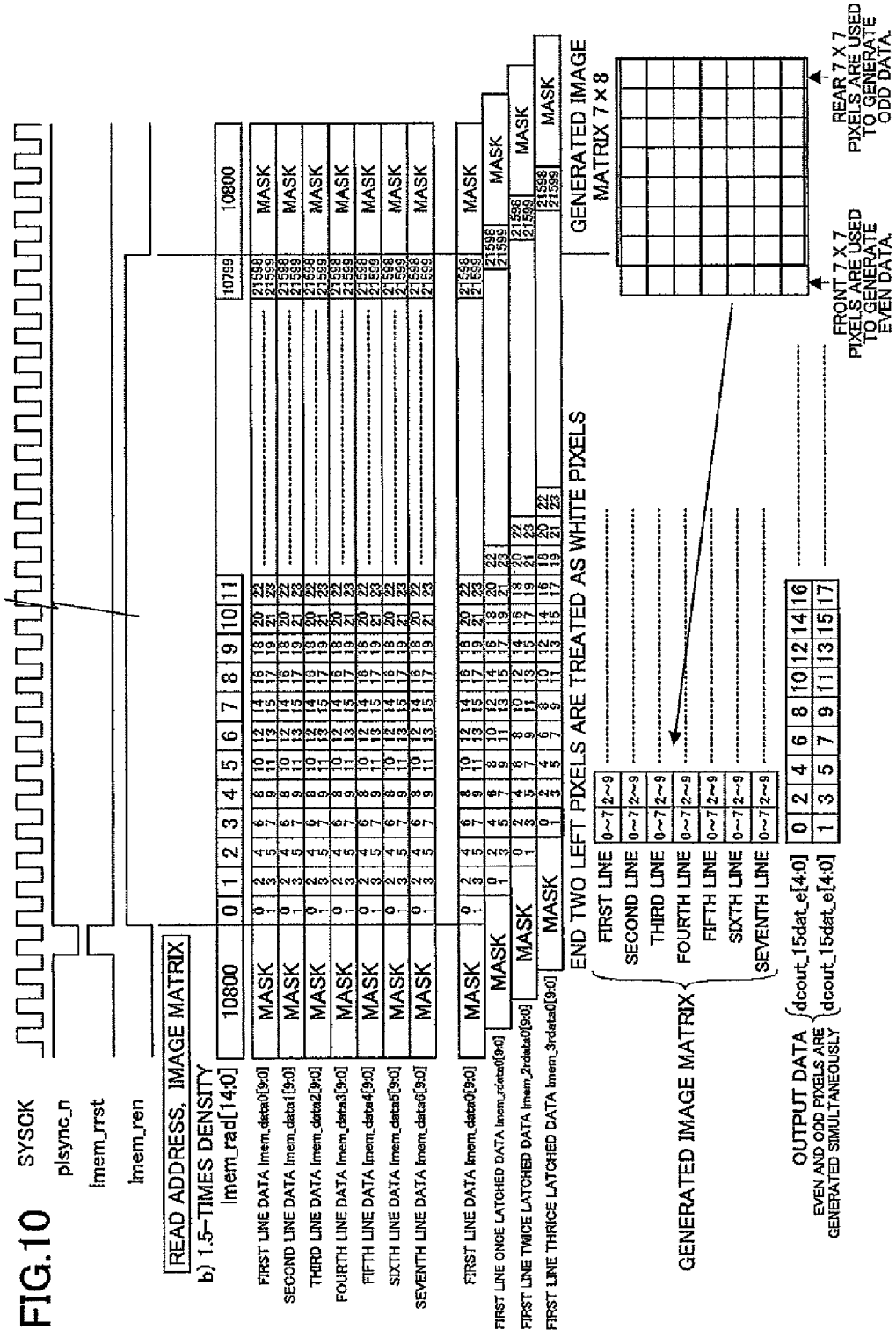

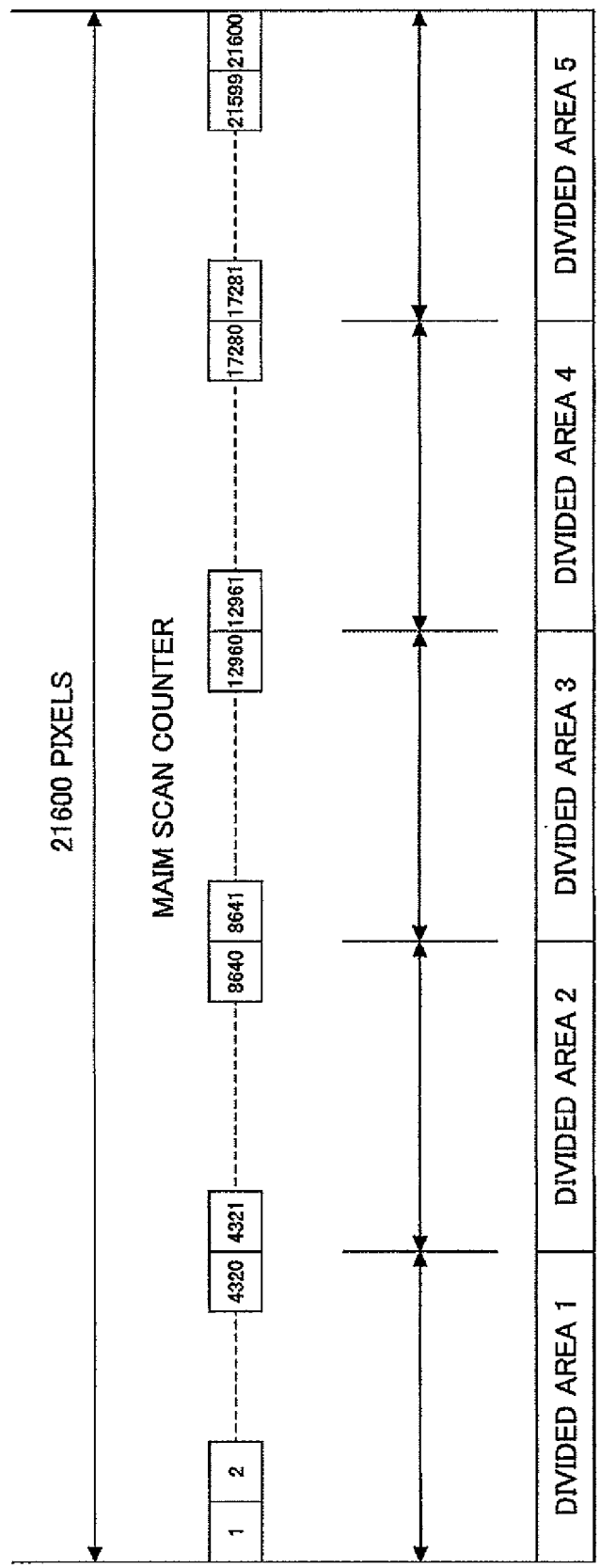

FIG. 12

FOR 10 MATCHING PATTERNS

| NAME | D7 | D6 | D5 | D4 | D3 | D2 | D1 | D0 | Def |
|---|---|---|---|---|---|---|---|---|---|
| hcopyset | - | | | | | | | set | 00h |
| inpat1-1 | inpat1-2[2:0] | | | | inpat1-1[4:0] | | | | 00h |
| inpat1-2 | inpat1-4[0] | inpat1-3[4:0] | | | | | inpat1-2[4:3] | | 00h |
| inpat1-3 | inpat1-5[3:0] | | | | inpat1-4[4:1] | | | | 00h |
| inpat1-4 | inpat1-7[1:0] | | inpat1-6[4:0] | | | | | inpat1-5[4] | 00h |
| inpat1-5 | inpat1-8[4:0] | | | | | inpat1-7[4:2] | | | 00h |
| inpat1-6 | inpat1-10[2:0] | | | | inpat1-9[4:0] | | | | 00h |
| inpat1-7 | inpat1-12[0] | inpat1-11[4:0] | | | | | inpat1-10[4:3] | | 00h |
| inpat1-8 | inpat1-13[3:0] | | | | inpat1-12[4:1] | | | | 00h |
| inpat1-9 | inpat1-14[1:0] | | inpat1-14[4:0] | | | | | inpat1-13[4] | 00h |
| inpat1-10 | inpat1-15[4:0] | | | | | inpat1-14[4:2] | | | 00h |
| inpat1-11 | inpat1-17[2:0] | | | | inpat1-16[4:0] | | | | 00h |
| inpat1-12 | inpat1-19[0] | inpat1-18[4:0] | | | | | inpat1-17[4:3] | | 00h |
| inpat1-13 | inpat1-20[3:0] | | | | inpat1-19[4:1] | | | | 00h |
| inpat1-14 | inpat1-23[1:0] | | inpat1-22[4:0] | | | | | inpat1-21[4] | 00h |
| inpat1-15 | inpat1-24[4:0] | | | | | inpat1-23[4:2] | | | 00h |
| inpat1-16 | inpat1-26[2:0] | | | | inpat1-25[4:0] | | | | 00h |
| inpat1-17 | inpat1-28[0] | inpat1-27[4:0] | | | | | inpat1-26[4:3] | | 00h |
| inpat1-18 | inpat1-29[3:0] | | | | inpat1-28[4:1] | | | | 00h |
| inpat1-19 | inpat1-31[1:0] | | inpat1-30[4:0] | | | | | inpat1-29[4] | 00h |
| inpat1-20 | inpat1-33[4:0] | | | | | inpat1-32[4:2] | | | 00h |
| inpat1-21 | inpat1-35[2:0] | | | | inpat1-34[4:0] | | | | 00h |
| inpat1-22 | inpat1-37[0] | inpat1-36[4:0] | | | | | inpat1-35[4:3] | | 00h |
| inpat1-23 | inpat1-38[3:0] | | | | inpat1-37[4:1] | | | | 00h |
| inpat1-24 | inpat1-40[1:0] | | inpat1-39[4:0] | | | | | inpat1-38[4] | 00h |
| inpat1-25 | inpat1-41[4:0] | | | | | inpat1-40[4:2] | | | 00h |
| inpat1-26 | inpat1-43[2:0] | | | | inpat1-42[4:0] | | | | 00h |
| inpat1-27 | inpat1-45[0] | inpat1-44[4:0] | | | | | inpat1-43[4:3] | | 00h |
| inpat1-28 | inpat1-46[3:0] | | | | inpat1-45[4:1] | | | | 00h |
| inpat1-29 | inpat1-48[1:0] | | inpat1-47[4:0] | | | | | inpat1-46[4] | 00h |
| inpat1-30 | inpat1-49[4:0] | | | | | inpat1-48[4:2] | | | 00h |

MATCHING PATTERN IS GENERATED.
EACH INPUT REGISTER SET VALUE CORRESPONDS
TO EACH PIXEL OF 7 X 7 MATRIX

| 1 | 2 | 3 | 4 | 5 | 6 | 7 |
|---|---|---|---|---|---|---|
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |
| 43 | 44 | 45 | 46 | 47 | 48 | 49 |

FIG.13

| NAME | D7 | D6 | D5 | D4 | D3 | D2 | D1 | D0 |
|---|---|---|---|---|---|---|---|---|
| outpat1-1 | \multicolumn{3}{c}{outpat1-2[2:0]} | | | \multicolumn{5}{c}{outpat1-1[4:0]} | | | | |
| outpat1-1 | outpat1-2[2:0] ||| outpat1-1[4:0] |||||
| outpat1-2 | outpat1-4[0] | outpat1-3[4:0] ||||| outpat1-2[4:3] ||
| outpat1-3 | outpat1-5[3:0] |||| outpat1-4[4:1] ||||
| outpat1-4 | outpat1-7[1:0] || outpat1-6[4:0] ||||| outpat1-5[4] |
| outpat1-5 | outpat1-8[4:0] ||||| outpat1-7[4:2] |||
| outpat1-6 | outpat1-10[2:0] ||| outpat1-9[4:0] |||||
| outpat1-7 | × ||||||| outpat1-10[4:3] |
| outpat2-1 | outpat2-2[2:0] ||| outpat2-1[4:0] |||||
| outpat2-2 | outpat2-4[0] | outpat2-3[4:0] ||||| outpat2-2[4:3] ||
| outpat2-3 | outpat2-5[3:0] |||| outpat2-4[4:1] ||||
| outpat2-4 | outpat2-7[1:0] || outpat2-6[4:0] ||||| |
| outpat2-5 | outpat2-8[4:0] ||||| outpat2-7[4:2] |||
| outpat2-6 | outpat2-10[2:0] ||| outpat2-9[4:0] |||||
| outpat2-7 | × ||||||| outpat2-10[4:3] |
| outpat3-1 | outpat3-2[2:0] ||| outpat3-1[4:0] |||||
| outpat3-2 | outpat3-4[0] | outpat3-3[4:0] ||||| outpat3-2[4:3] ||
| outpat3-3 | outpat3-5[3:0] |||| outpat3-4[4:1] ||||
| outpat3-4 | outpat3-7[1:0] || outpat3-6[4:0] ||||| |
| outpat3-5 | outpat3-8[4:0] ||||| outpat3-7[4:2] |||
| outpat3-6 | outpat3-10[2:0] ||| outpat3-9[4:0] |||||
| outpat3-7 | × ||||||| outpat3-10[4:3] |
| outpat4-1 | outpat4-2[2:0] ||| outpat4-1[4:0] |||||
| outpat4-2 | outpat4-4[0] | outpat4-3[4:0] ||||| outpat4-2[4:3] ||
| outpat4-3 | outpat4-5[3:0] |||| outpat4-4[4:1] ||||
| outpat4-4 | outpat4-7[1:0] || outpat4-6[4:0] ||||| |
| outpat4-5 | outpat4-8[4:0] ||||| outpat4-7[4:2] |||
| outpat4-6 | outpat4-10[2:0] ||| outpat4-9[4:0] |||||
| outpat4-7 | × ||||||| outpat4-10[4:3] |

FIG.14

| NAME | D7 | D6 | D5 | D4 | D3 | D2 | D1 | D0 |
|---|---|---|---|---|---|---|---|---|
| outpat5-1 | | outpat5-2[2:0] | | | outpat5-1[4:0] | | | |
| outpat5-2 | outpat5-4[0] | | outpat5-3[4:0] | | | | outpat5-2[4:3] | |
| outpat5-3 | | outpat5-5[3:0] | | | | outpat5-4[4:1] | | |
| outpat5-4 | outpat5-7[1:0] | | | outpat5-6[4:0] | | | | outpat5-5[4] |
| outpat5-5 | | | outpat5-8[4:0] | | | | outpat5-7[4:2] | |
| outpat5-6 | | outpat5-10[2:0] | | | outpat5-9[4:0] | | | |
| outpat5-7 | | | | | | | | outpat5-10[4:3] |
| outpat6-1 | | outpat6-2[2:0] | | | outpat6-1[4:0] | | | |
| outpat6-2 | outpat6-4[0] | | outpat6-3[4:0] | | | | outpat6-2[4:3] | |
| outpat6-3 | | outpat6-5[3:0] | | | | outpat6-4[4:1] | | |
| outpat6-4 | outpat6-7[1:0] | | | outpat6-6[4:0] | | | | |
| outpat6-5 | | | outpat6-8[4:0] | | | | outpat6-7[4:2] | |
| outpat6-6 | | outpat6-10[2:0] | | | outpat6-9[4:0] | | | |
| outpat6-7 | | | | | | | | outpat6-10[4:3] |
| outpat7-1 | | outpat7-2[2:0] | | | outpat7-1[4:0] | | | |
| outpat7-2 | outpat7-4[0] | | outpat7-3[4:0] | | | | outpat7-2[4:3] | |
| outpat7-3 | | outpat7-5[3:0] | | | | outpat7-4[4:1] | | |
| outpat7-4 | outpat7-7[1:0] | | | outpat7-6[4:0] | | | | |
| outpat7-5 | | | outpat7-8[4:0] | | | | outpat7-7[4:2] | |
| outpat7-6 | | outpat7-10[2:0] | | | outpat7-9[4:0] | | | |
| outpat7-7 | | | | | | | | outpat7-10[4:3] |
| outpat8-1 | | outpat8-2[2:0] | | | outpat8-1[4:0] | | | |
| outpat8-2 | outpat8-4[0] | | outpat8-3[4:0] | | | | outpat8-2[4:3] | |
| outpat8-3 | | outpat8-5[3:0] | | | | outpat8-4[4:1] | | |
| outpat8-4 | outpat8-7[1:0] | | | outpat8-6[4:0] | | | | |
| outpat8-5 | | | outpat8-8[4:0] | | | | outpat8-7[4:2] | |
| outpat8-6 | | outpat8-10[2:0] | | | outpat8-9[4:0] | | | |
| outpat8-7 | | | | | | | | outpat8-10[4:3] |

FIG.15

| NAME | D7 | D6 | D5 | D4 | D3 | D2 | D1 | D0 |
|---|---|---|---|---|---|---|---|---|
| outpat9-1 | outpat9-2[2:0] ||| outpat9-1[4:0] |||||
| outpat9-2 | outpat9-4[0] | outpat9-3[4:0] ||||| outpat9-2[4:3] ||
| outpat9-3 | outpat9-5[3:0] |||| outpat9-4[4:1] ||||
| outpat9-4 | outpat9-7[1:0] || outpat9-6[4:0] ||||| outpat9-5[4] |
| outpat9-5 | outpat9-8[4:0] ||||| outpat9-7[4:2] |||
| outpat9-6 | outpat9-10[2:0] ||| outpat9-9[4:0] |||||
| outpat9-7 | colspan: 5 ||||| colspan: outpat9-10[4:3] |||
| outpat10-1 | outpat10-2[2:0] ||| outpat10-1[4:0] |||||
| outpat10-2 | outpat10-4[0] | outpat10-3[4:0] ||||| outpat10-2[4:3] ||
| outpat10-3 | outpat10-5[3:0] |||| outpat10-4[4:1] ||||
| outpat10-4 | outpat10-7[1:0] || outpat10-6[4:0] ||||| |
| outpat10-5 | outpat10-8[4:0] ||||| outpat10-7[4:2] |||
| outpat10-6 | outpat10-10[2:0] ||| outpat10-9[4:0] |||||
| outpat10-7 | colspan: 5 ||||| colspan: outpat10-10[4:3] |||
| outpat11-1 | outpat11-2[2:0] ||| outpat11-1[4:0] |||||
| outpat11-2 | outpat11-4[0] | outpat11-3[4:0] ||||| outpat11-2[4:3] ||
| outpat11-3 | outpat11-5[3:0] |||| outpat11-4[4:1] ||||
| outpat11-4 | outpat11-7[1:0] || outpat11-6[4:0] ||||| |
| outpat11-5 | outpat11-8[4:0] ||||| outpat11-7[4:2] |||
| outpat11-6 | outpat11-10[2:0] ||| outpat11-9[4:0] |||||
| outpat11-7 | colspan: 5 ||||| colspan: outpat11-10[4:3] |||
| outpat12-1 | outpat12-2[2:0] ||| outpat12-1[4:0] |||||
| outpat12-2 | outpat12-4[0] | outpat12-3[4:0] ||||| outpat12-2[4:3] ||
| outpat12-3 | outpat12-5[3:0] |||| outpat12-4[4:1] ||||
| outpat12-4 | outpat12-7[1:0] || outpat12-6[4:0] ||||| |
| outpat12-5 | outpat12-8[4:0] ||||| outpat12-7[4:2] |||
| outpat12-6 | outpat12-10[2:0] ||| outpat12-9[4:0] |||||
| outpat12-7 | colspan: 5 ||||| colspan: outpat12-10[4:3] |||

FIG.16

| NAME | D7 | D6 | D5 | D4 | D3 | D2 | D1 | D0 |
|---|---|---|---|---|---|---|---|---|
| outpat13-1 | outpat13-2[2:0] | | | outpat13-1[4:0] | | | | |
| outpat13-2 | outpat13-4[0] | outpat13-3[4:0] | | | | | outpat13-2[4:3] | |
| outpat13-3 | outpat13-5[3:0] | | | | outpat13-4[4:1] | | | |
| outpat13-4 | outpat13-7[1:0] | | outpat13-6[4:0] | | | | | outpat13-5[4] |
| outpat13-5 | outpat13-8[4:0] | | | | | outpat13-7[4:2] | | |
| outpat13-6 | outpat13-10[2:0] | | | outpat13-9[4:0] | | | | |
| outpat13-7 | | | | | | | | outpat13-10[4:3] |
| outpat14-1 | outpat14-2[2:0] | | | outpat14-1[4:0] | | | | |
| outpat14-2 | outpat14-4[0] | outpat14-3[4:0] | | | | | outpat14-2[4:3] | |
| outpat14-3 | outpat14-5[3:0] | | | | outpat14-4[4:1] | | | |
| outpat14-4 | outpat14-7[1:0] | | outpat14-6[4:0] | | | | | |
| outpat14-5 | outpat14-8[4:0] | | | | | outpat14-7[4:2] | | |
| outpat14-6 | outpat14-10[2:0] | | | outpat14-9[4:0] | | | | |
| outpat14-7 | | | | | | | | outpat14-10[4:3] |
| outpat15-1 | outpat15-2[2:0] | | | outpat15-1[4:0] | | | | |
| outpat15-2 | outpat15-4[0] | outpat15-3[4:0] | | | | | outpat15-2[4:3] | |
| outpat15-3 | outpat15-5[3:0] | | | | outpat15-4[4:1] | | | |
| outpat15-4 | outpat15-7[1:0] | | outpat15-6[4:0] | | | | | |
| outpat15-5 | outpat15-8[4:0] | | | | | outpat15-7[4:2] | | |
| outpat15-6 | outpat15-10[2:0] | | | outpat15-9[4:0] | | | | |
| outpat15-7 | | | | | | | | outpat15-10[4:3] |
| outpat16-1 | outpat16-2[2:0] | | | outpat16-1[4:0] | | | | |
| outpat16-2 | outpat16-4[0] | outpat16-3[4:0] | | | | | outpat16-2[4:3] | |
| outpat16-3 | outpat16-5[3:0] | | | | outpat16-4[4:1] | | | |
| outpat16-4 | outpat16-7[1:0] | | outpat16-6[4:0] | | | | | |
| outpat16-5 | outpat16-8[4:0] | | | | | outpat16-7[4:2] | | |
| outpat16-6 | outpat16-10[2:0] | | | outpat16-9[4:0] | | | | |
| outpat16-7 | | | | | | | | outpat16-10[4:3] |

FIG.19
IN CASE OF MULTI-LEVEL
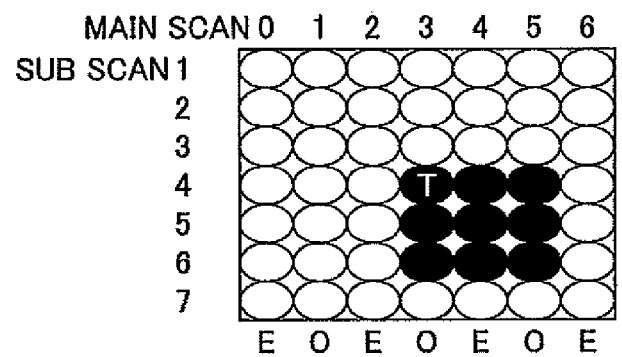
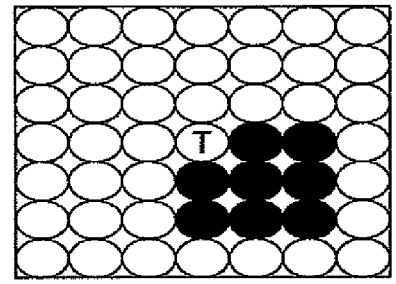
IN A CASE WHERE
SETTING OF outpat IS 0

FIG.24A

| NAME | D7 | D6 | D5 | D4 | D3 | D2 | D1 | D0 |
|---|---|---|---|---|---|---|---|---|
| outpatL1-1 | \multicolumn{3}{c}{outpatL1-2[2:0]} | | | outpatL1-1[4:0] | | | |
| outpatL1-1 | outpatL1-2[2:0] ||| outpatL1-1[4:0] |||||
| outpatL1-2 | outpatL1-4[0] | outpatL1-3[4:0] |||| outpatL1-2[4:3] |||
| outpatL1-3 | outpatL1-5[3:0] |||| outpatL1-4[4:1] ||||
| outpatL1-4 | outpatL1-7[1:0] || outpatL1-6[4:0] ||||| outpatL1-5[4] |
| outpatL1-5 | outpatL1-8[4:0] ||||| outpatL1-7[4:2] |||
| outpatL1-6 | outpatL1-10[2:0] ||| outpatL1-9[4:0] |||||
| outpatL1-7 | ||||||| outpatL1-10[4:3] |
| outpatL2-1 | outpatL2-2[2:0] ||| outpatL2-1[4:0] |||||
| outpatL2-2 | outpatL2-4[0] | outpatL2-3[4:0] |||| outpatL2-2[4:3] |||
| outpatL2-3 | outpatL2-5[3:0] |||| outpatL2-4[4:1] ||||
| outpatL2-4 | outpatL2-7[1:0] || outpatL2-6[4:0] ||||| outpatL2-5[4] |
| outpatL2-5 | outpatL2-8[4:0] ||||| outpatL2-7[4:2] |||
| outpatL2-6 | outpatL2-10[2:0] ||| outpatL2-9[4:0] |||||
| outpatL2-7 | ||||||| outpatL2-10[4:3] |
| outpatL3-1 | outpatL3-2[2:0] ||| outpatL3-1[4:0] |||||
| outpatL3-2 | outpatL3-4[0] | outpatL3-3[4:0] |||| outpatL3-2[4:3] |||
| outpatL3-3 | outpatL3-5[3:0] |||| outpatL3-4[4:1] ||||
| outpatL3-4 | outpatL3-7[1:0] || outpatL3-6[4:0] ||||| outpatL3-5[4] |
| outpatL3-5 | outpatL3-8[4:0] ||||| outpatL3-7[4:2] |||
| outpatL3-6 | outpatL3-10[2:0] ||| outpatL3-9[4:0] |||||
| outpatL3-7 | ||||||| outpatL3-10[4:3] |
| outpatL4-1 | outpatL4-2[2:0] ||| outpatL4-1[4:0] |||||
| outpatL4-2 | outpatL4-4[0] | outpatL4-3[4:0] |||| outpatL4-2[4:3] |||
| outpatL4-3 | outpatL4-5[3:0] |||| outpatL4-4[4:1] ||||
| outpatL4-4 | outpatL4-7[1:0] || outpatL4-6[4:0] ||||| outpatL4-5[4] |
| outpatL4-5 | outpatL4-8[4:0] ||||| outpatL4-7[4:2] |||
| outpatL4-6 | outpatL4-10[2:0] ||| outpatL4-9[4:0] |||||
| outpatL4-7 | ||||||| outpatL4-10[4:3] |

FIG.24B

| NAME | D7 | D6 | D5 | D4 | D3 | D2 | D1 | D0 |
|---|---|---|---|---|---|---|---|---|
| outpatL5-1 | | outpatL5-2[2:0] | | | outpatL5-1[4:0] | | | |
| outpatL5-2 | outpatL5-4[0] | | outpatL5-3[4:0] | | | | outpatL5-2[4:3] | |
| outpatL5-3 | | outpatL5-5[3:0] | | | | outpatL5-4[4:1] | | |
| outpatL5-4 | outpatL5-7[1:0] | | | outpatL5-6[4:0] | | | | outpatL5-5[4] |
| outpatL5-5 | | outpatL5-8[4:0] | | | | outpatL5-7[4:2] | | |
| outpatL5-6 | | outpatL5-10[2:0] | | | outpatL5-9[4:0] | | | |
| outpatL5-7 | | | | | | | | outpatL5-10[4:3] |
| outpatL6-1 | | outpatL6-2[2:0] | | | outpatL6-1[4:0] | | | |
| outpatL6-2 | outpatL6-4[0] | | outpatL6-3[4:0] | | | | outpatL6-2[4:3] | |
| outpatL6-3 | | outpatL6-5[3:0] | | | | outpatL6-4[4:1] | | |
| outpatL6-4 | outpatL6-7[1:0] | | | outpatL6-6[4:0] | | | | outpatL6-5[4] |
| outpatL6-5 | | outpatL6-8[4:0] | | | | outpatL6-7[4:2] | | |
| outpatL6-6 | | outpatL6-10[2:0] | | | outpatL6-9[4:0] | | | |
| outpatL6-7 | | | | | | | | outpatL6-10[4:3] |
| outpatL7-1 | | outpatL7-2[2:0] | | | outpatL7-1[4:0] | | | |
| outpatL7-2 | outpatL7-4[0] | | outpatL7-3[4:0] | | | | outpatL7-2[4:3] | |
| outpatL7-3 | | outpatL7-5[3:0] | | | | outpatL7-4[4:1] | | |
| outpatL7-4 | outpatL7-7[1:0] | | | outpatL7-6[4:0] | | | | outpatL7-5[4] |
| outpatL7-5 | | outpatL7-8[4:0] | | | | outpatL7-7[4:2] | | |
| outpatL7-6 | | outpatL7-10[2:0] | | | outpatL7-9[4:0] | | | |
| outpatL7-7 | | | | | | | | outpatL7-10[4:3] |
| outpatL8-1 | | outpatL8-2[2:0] | | | outpatL8-1[4:0] | | | |
| outpatL8-2 | outpatL8-4[0] | | outpatL8-3[4:0] | | | | outpatL8-2[4:3] | |
| outpatL8-3 | | outpatL8-5[3:0] | | | | outpatL8-4[4:1] | | |
| outpatL8-4 | outpatL8-7[1:0] | | | outpatL8-6[4:0] | | | | outpatL8-5[4] |
| outpatL8-5 | | outpatL8-8[4:0] | | | | outpatL8-7[4:2] | | |
| outpatL8-6 | | outpatL8-10[2:0] | | | outpatL8-9[4:0] | | | |
| outpatL8-7 | | | | | | | | outpatL8-10[4:3] |

FIG.25A

| NAME | D7 | D6 | D5 | D4 | D3 | D2 | D1 | D0 |
|---|---|---|---|---|---|---|---|---|
| outpatR1-1 | \multicolumn{3}{c}{outpatR1-2[2:0]} | | | \multicolumn{3}{c}{outpatR1-1[4:0]} | |
| outpatR1-2 | outpatR1-4[0] | \multicolumn{5}{c}{outpatR1-3[4:0]} | | outpatR1-2[4:3] | |
| outpatR1-3 | \multicolumn{4}{c}{outpatR1-5[3:0]} | | | \multicolumn{3}{c}{outpatR1-4[4:1]} |
| outpatR1-4 | outpatR1-7[1:0] | | \multicolumn{5}{c}{outpatR1-6[4:0]} | | outpatR1-5[4] |
| outpatR1-5 | \multicolumn{5}{c}{outpatR1-8[4:0]} | | \multicolumn{3}{c}{outpatR1-7[4:2]} |
| outpatR1-6 | \multicolumn{3}{c}{outpatR1-10[2:0]} | | | \multicolumn{3}{c}{outpatR1-9[4:0]} | |
| outpatR1-7 | | | | | | | | outpatR1-10[4:3] |
| outpatR2-1 | \multicolumn{3}{c}{outpatR2-2[2:0]} | | | \multicolumn{3}{c}{outpatR2-1[4:0]} | |
| outpatR2-2 | outpatR2-4[0] | \multicolumn{5}{c}{outpatR2-3[4:0]} | | outpatR2-2[4:3] | |
| outpatR2-3 | \multicolumn{4}{c}{outpatR2-5[3:0]} | | | \multicolumn{3}{c}{outpatR2-4[4:1]} |
| outpatR2-4 | outpatR2-7[1:0] | | \multicolumn{5}{c}{outpatR2-6[4:0]} | | outpatR2-5[4] |
| outpatR2-5 | \multicolumn{5}{c}{outpatR2-8[4:0]} | | \multicolumn{3}{c}{outpatR2-7[4:2]} |
| outpatR2-6 | \multicolumn{3}{c}{outpatR2-10[2:0]} | | | \multicolumn{3}{c}{outpatR2-9[4:0]} | |
| outpatR2-7 | | | | | | | | outpatR2-10[4:3] |
| outpatR3-1 | \multicolumn{3}{c}{outpatR3-2[2:0]} | | | \multicolumn{3}{c}{outpatR3-1[4:0]} | |
| outpatR3-2 | outpatR3-4[0] | \multicolumn{5}{c}{outpatR3-3[4:0]} | | outpatR3-2[4:3] | |
| outpatR3-3 | \multicolumn{4}{c}{outpatR3-5[3:0]} | | | \multicolumn{3}{c}{outpatR3-4[4:1]} |
| outpatR3-4 | outpatR3-7[1:0] | | \multicolumn{5}{c}{outpatR3-6[4:0]} | | outpatR3-5[4] |
| outpatR3-5 | \multicolumn{5}{c}{outpatR3-8[4:0]} | | \multicolumn{3}{c}{outpatR3-7[4:2]} |
| outpatR3-6 | \multicolumn{3}{c}{outpatR3-10[2:0]} | | | \multicolumn{3}{c}{outpatR3-9[4:0]} | |
| outpatR3-7 | | | | | | | | outpatR3-10[4:3] |
| outpatR4-1 | \multicolumn{3}{c}{outpatR4-2[2:0]} | | | \multicolumn{3}{c}{outpatR4-1[4:0]} | |
| outpatR4-2 | outpatR4-4[0] | \multicolumn{5}{c}{outpatR4-3[4:0]} | | outpatR4-2[4:3] | |
| outpatR4-3 | \multicolumn{4}{c}{outpatR4-5[3:0]} | | | \multicolumn{3}{c}{outpatR4-4[4:1]} |
| outpatR4-4 | outpatR4-7[1:0] | | \multicolumn{5}{c}{outpatR4-6[4:0]} | | outpatR4-5[4] |
| outpatR4-5 | \multicolumn{5}{c}{outpatR4-8[4:0]} | | \multicolumn{3}{c}{outpatR4-7[4:2]} |
| outpatR4-6 | \multicolumn{3}{c}{outpatR4-10[2:0]} | | | \multicolumn{3}{c}{outpatR4-9[4:0]} | |
| outpatR4-7 | | | | | | | | outpatR4-10[4:3] |

FIG.25B

| NAME | D7 | D6 | D5 | D4 | D3 | D2 | D1 | D0 |
|---|---|---|---|---|---|---|---|---|
| outpatR5-1 | \multicolumn{3}{l}{outpatR5-2[2:0]} | | \multicolumn{4}{l}{outpatR5-1[4:0]} |
| outpatR5-2 | outpatR5-4[0] | \multicolumn{5}{l}{outpatR5-3[4:0]} | \multicolumn{2}{l}{outpatR5-2[4:3]} |
| outpatR5-3 | \multicolumn{4}{l}{outpatR5-5[3:0]} | \multicolumn{4}{l}{outpatR5-4[4:1]} |
| outpatR5-4 | \multicolumn{2}{l}{outpatR5-7[1:0]} | \multicolumn{5}{l}{outpatR5-6[4:0]} | outpatR5-5[4] |
| outpatR5-5 | \multicolumn{5}{l}{outpatR5-8[4:0]} | \multicolumn{3}{l}{outpatR5-7[4:2]} |
| outpatR5-6 | \multicolumn{3}{l}{outpatR5-10[2:0]} | \multicolumn{5}{l}{outpatR5-9[4:0]} |
| outpatR5-7 | | | | | | | | outpatR5-10[4:3] |
| outpatR6-1 | \multicolumn{3}{l}{outpatR6-2[2:0]} | \multicolumn{5}{l}{outpatR6-1[4:0]} |
| outpatR6-2 | outpatR6-4[0] | \multicolumn{5}{l}{outpatR6-3[4:0]} | \multicolumn{2}{l}{outpatR6-2[4:3]} |
| outpatR6-3 | \multicolumn{4}{l}{outpatR6-5[3:0]} | \multicolumn{4}{l}{outpatR6-4[4:1]} |
| outpatR6-4 | \multicolumn{2}{l}{outpatR6-7[1:0]} | \multicolumn{5}{l}{outpatR6-6[4:0]} | outpatR6-5[4] |
| outpatR6-5 | \multicolumn{5}{l}{outpatR6-8[4:0]} | \multicolumn{3}{l}{outpatR6-7[4:2]} |
| outpatR6-6 | \multicolumn{3}{l}{outpatR6-10[2:0]} | \multicolumn{5}{l}{outpatR6-9[4:0]} |
| outpatR6-7 | | | | | | | | outpatR6-10[4:3] |
| outpatR7-1 | \multicolumn{3}{l}{outpatR7-2[2:0]} | \multicolumn{5}{l}{outpatR7-1[4:0]} |
| outpatR7-2 | outpatR7-4[0] | \multicolumn{5}{l}{outpatR7-3[4:0]} | \multicolumn{2}{l}{outpatR7-2[4:3]} |
| outpatR7-3 | \multicolumn{4}{l}{outpatR7-5[3:0]} | \multicolumn{4}{l}{outpatR7-4[4:1]} |
| outpatR7-4 | \multicolumn{2}{l}{outpatR7-7[1:0]} | \multicolumn{5}{l}{outpatR7-6[4:0]} | outpatR7-5[4] |
| outpatR7-5 | \multicolumn{5}{l}{outpatR7-8[4:0]} | \multicolumn{3}{l}{outpatR7-7[4:2]} |
| outpatR7-6 | \multicolumn{3}{l}{outpatR7-10[2:0]} | \multicolumn{5}{l}{outpatR7-9[4:0]} |
| outpatR7-7 | | | | | | | | outpatR7-10[4:3] |
| outpatR8-1 | \multicolumn{3}{l}{outpatR8-2[2:0]} | \multicolumn{5}{l}{outpatR8-1[4:0]} |
| outpatR8-2 | outpatR8-4[0] | \multicolumn{5}{l}{outpatR8-3[4:0]} | \multicolumn{2}{l}{outpatR8-2[4:3]} |
| outpatR8-3 | \multicolumn{4}{l}{outpatR8-5[3:0]} | \multicolumn{4}{l}{outpatR8-4[4:1]} |
| outpatR8-4 | \multicolumn{2}{l}{outpatR8-7[1:0]} | \multicolumn{5}{l}{outpatR8-6[4:0]} | outpatR8-5[4] |
| outpatR8-5 | \multicolumn{5}{l}{outpatR8-8[4:0]} | \multicolumn{3}{l}{outpatR8-7[4:2]} |
| outpatR8-6 | \multicolumn{3}{l}{outpatR8-10[2:0]} | \multicolumn{5}{l}{outpatR8-9[4:0]} |
| outpatR8-7 | | | | | | | | outpatR8-10[4:3] |

OPTICAL WRITING APPARATUS, IMAGE FORMING APPARATUS AND COMPUTER READABLE INFORMATION RECORDING MEDIUM

BACKGROUND OF THE INVENTION

1. Field of the Invention

The present invention relates to an optical writing apparatus having a function of superposing an unauthorized copy protection pattern (such a function being referred to as an unauthorized copy protection function, hereinafter), an image forming apparatus such as a copier or a digital multi-function peripheral (MFP) having a copying function, and a computer readable information recording medium storing a program for controlling operation of the optical writing apparatus.

2. Description of the Related Art

For example, in a copier generally used, the unauthorized copy protection function is mounted. The unauthorized copy protection function is a function for which a first image processing apparatus prints an image after superposing an unauthorized copy protection pattern on given image data. A second image processing apparatus has a function of preventing itself from carrying out unauthorized copying operation. When the second image processing apparatus reads the image in which the unauthorized copy protection pattern has been thus superposed, the second image processing apparatus recognizes the unauthorized copy protection pattern. As a result, the second image protection apparatus treats the image as an unauthorized copy protection image, and thus the second image processing apparatus is controlled to prevent itself from printing the unauthorized copy protection image. Thus, copy protection is achieved. In order that the unauthorized copy protection function actually work well, the second image processing apparatus should positively recognize from the read image the unauthorized copy protection pattern superposed by the first image processing apparatus.

Japanese Laid-Open Patent Application 2004-237687 discloses a method and apparatus. In the method and apparatus, a thermally reversible printing medium is used which has a thermally reversible recording layer in which visible information can be displayed and erased, because thermal energy reversibly changes a state of the thermally reversible recording layer between a coloring state and an erasing state. In the thermally reversible printing medium, information is embedded such as whether copying is allowed, a copyright, a confidential term and characteristics of the printing medium. The embedded information is read and analyzed.

Japanese Patent No. 3078433, Japanese Laid-Open Patent Application 7-273984 and U.S. Pat. No. 5,647,010 disclose image processing apparatuses having functions of unauthorized copy protection.

Currently, when a so-called A0 wide machine is used as an image forming apparatus or an image processing apparatus to print an image, a dot shape of one dot may be such that a size is larger and it has a long shape in a vertical direction as a whole (see FIG. 29(c) and FIG. 30(c)), in comparison to a case where a common so-called LD writing machine is used as an image forming apparatus or an image processing apparatus to print an image. This is because an LED print head (abbreviated as LPH hereinafter) having a plurality of LED devices is used in the A0 wide machine, and also, because of other process conditions. As a result, an unauthorized copy protection pattern may not satisfy requirements prescribed in a required standard for unauthorized copy protection patterns. If the requirements of the standard are not met, the unauthorized copy protection pattern superposed by the first image processing apparatus may not be recognized by the second image processing apparatus. If the second image processing apparatus cannot recognize the unauthorized copy protection pattern, the second image processing apparatus problematically cannot be controlled to prevent itself from printing the unauthorized copy protection image. Thus, the second image processing apparatus can be problematically used to copy even such an unauthorized copy protection image. As a result, unauthorized copy protection cannot be achieved. The above-mentioned process conditions mean developing roller diameters, developing systems, toner ingredient diameters, and so forth. These conditions are different between the above-mentioned A0 wide machine which is provided for A0-size paper and another machine which is provided for A3-size paper or for smaller paper.

SUMMARY OF THE INVENTION

In order to solve the problem, after an unauthorized copy protection pattern is superposed on given image data, image data of the unauthorized copy protection pattern is corrected in pixel units, so that a size of an isolated dot included in the unauthorized copy protection pattern is controlled. After the image data of the unauthorized copy protection pattern is thus controlled, an image represented by the given image data and the image data of the unauthorized copy protection pattern is written on a photosensitive body.

Thus, from image data (referred to as an entirety of image data hereinafter) in which image data of an unauthorized copy protection pattern is superposed on given image data, the unauthorized copy protection pattern is recognized. Then, the thus-recognized unauthorized copy protection pattern is corrected in pixel unit before the entirety of image data is actually printed. As a result, it is possible to control with high accuracy a size of an isolated dot included in the unauthorized copy protection pattern which is included in an image consequently printed. As a result, a first image processing apparatus can print an image including an unauthorized copy protection pattern, which has been thus controlled with high accuracy in a size of the isolated dot included therein. Then, when this image of printed matter is read by a second image processing apparatus having a function of preventing itself from printing an unauthorized copy protection image, the second image processing apparatus can positively recognize the unauthorized copy protection pattern included in the read image. Thus, unauthorized copy protection can be achieved, and the unauthorized copy protection function of the first image processing apparatus can work well.

Other objects, features and advantages of the present invention will become more apparent from the following detailed description when read in conjunction with the accompanying drawings.

BRIEF DESCRIPTION OF THE DRAWINGS

FIG. 1A shows a block diagram of a general configuration of an image forming apparatus of an embodiment 1;

FIG. 5 shows a relationship between a magnification and a matrix size;

FIGS. 7A and 7B show timing charts in detail of timing of memory read/write in FIG. 6;

FIG. 9 shows contents of settings of an image matrix generating part register (hcopyset);

FIG. 10 shows a timing chart of timing for when an image matrix is generated in the unauthorized copy protection pattern correcting part;

FIG. 11 shows an example of dividing an image in a main scan direction in the embodiment 1;

FIG. 12 shows examples of pattern matching and a matching pattern for pattern recognition carried out in a pattern recognizing and output image generating part;

FIGS. 13, 14, 15 and 16 show examples of output registers prepared for respective divided image areas for when an image matrix is matched by a matching pattern;

FIG. 19 shows correction of an unauthorized copy protection pattern in a multi-level mode;

FIGS. 24A, 24B, 25A and 25B show examples of output registers prepared for the joint portions;

DESCRIPTION OF REFERENCE NUMERALS

100 READING PART
200 COPYING PART
300 IMAGE INFORMATION STORING PART
301 IMAGE MEMORY PART
302 SYSTEM CONTROL UNIT
302-1 CPU
302-2 ROM
302-3 RAM
400 OPERATING PART
500 WRITING PART
501 IMAGE CONVERTING PART
501-2 MEMORY CONTROL PART
501-21 LINE MEMORY
501-22 IMAGE MATRIX GENERATING PART
501-23 LINE MEMORY CONTROL PART
501-3 UNAUTHORIZED COPY PROTECTION PATTERN CORRECTING PART
501-31 DELAY PART
501-32 IMAGE MATRIX GENERATING PART
501-33 PATTERN RECOGNIZING AND OUTPUT IMAGE GENERATING PART
502 LPH CONTROL CIRCUIT
503-1, 2, 3 LPH
505 DRIVING CONTROL PART

Detailed Description of the Preferred Embodiments

One idea to solve the above-mentioned problem is to control a size of an isolated dot included in an unauthorized copy protection pattern with the use of a so-called thinning function or such, for the purpose that the above-mentioned requirements of the standard for unauthorized copy protection patterns may be met. Actually, for a horizontal direction of an image, the above-mentioned thinning function may be effective. However, for a vertical direction, the thinning function may not be sufficiently effective. Therefore, it may not be possible that the requirements of the standard are met, by this method. Further, when control of image processing is made for the vertical direction of a given image, an influence may appear to the entirety of the image. Therefore, control of image processing for the vertical direction may not be effective. Further, a pixel diameter of each LED device of an LPH depends on generally-used components/parts. Thus, it may be difficult to change the pixel diameter of the LED device. Further, a change of the above-mentioned process conditions may have an adverse effect, and thus, it may not be possible to actually change the process conditions. Therefore, it may be actually difficult to change developing roller diameters, developing systems, toner ingredient diameters, and so forth, to achieve a dot diameter equivalent to a dot diameter obtained from another type of image forming apparatus provided for smaller-size paper, to meet the requirements of the standard.

Figure 26:
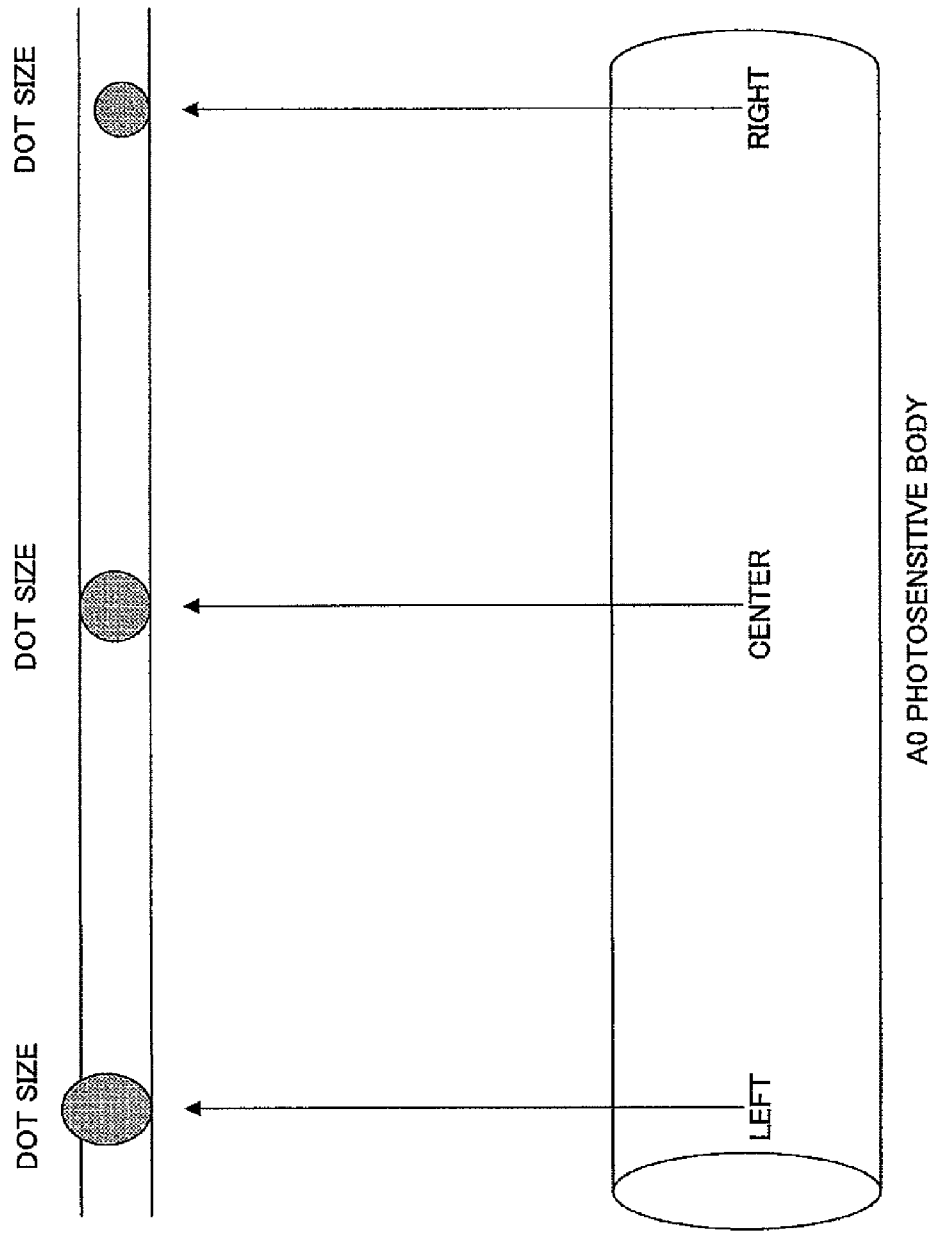
FIG. 26 conceptually shows an example where a dot diameter varies depending on a position on a photosensitive body.

In an embodiment of the present invention, in an image writing part, line memories are used and a small image matrix (simply referred to as an image matrix) is extracted in sequence. By reading the thus-extracted image matrix, an unauthorized copy protection pattern is recognized if the image matrix includes an isolated dot of the unauthorized copy protection pattern. When the unauthorized copy protection pattern is thus recognized from the image matrix, a size of the entirety of a dot pattern of the isolated dot included in the unauthorized copy protection pattern is controlled as a result of a light emitting amount of a LED device is controlled for each pixel. Because an A0 photosensitive body has a wide width, process characteristics vary depending on a height on the photosensitive body. As a result, a dot diameter of a dot consequently formed on paper may vary. FIG. 26 shows an example of such a phenomenon. That is, a size of a dot may vary, as shown in FIG. 26, among a left side, a center and a right side on the A0 photosensitive body.

In order to effectively control such a variation of a dot diameter even on an A0 photosensitive body for example, and to consequently improve an accuracy of recognizing an unauthorized copy protection pattern or a recognition rate, a first aspect of an embodiment has the following configuration. That is, an optical writing apparatus superposes an unauthorized copy protection pattern on given image data, and carries out optical writing on a photosensitive body with the use of a light emitting device array. A storing part is provided to store every n lines of the image data. A matrix generating part is provided to generate an image matrix of n×n (n denotes an integer equal to or more than 2) with the use of the image data read from the storing part. A control part is provided to check image data of the image matrix generated by the matrix generating part to recognize the unauthorized copy protection pattern. The control part corrects the image data of the unauthorized copy protection pattern in pixel units when thus recognizing the unauthorized copy protection pattern. The control part thus controls a size of an isolated dot of the unauthorized copy protection pattern. Further, the control part divides a given image in a main scan direction, and controls a size of an isolated dot of the unauthorized copy protection pattern separately for each of the thus-obtained divided image areas.

In a second aspect of an embodiment, in addition to the above-mentioned first aspect, a plurality of light emitting device arrays, each having a width shorter than a size of A0 paper to which an image written on the photosensitive body is transferred, are arranged as follows: That is, the light emitting device arrays overlap each other along the main scan direction. Optical writing is carried out for a writing width of an A0 size. The control part controls a size of an isolated dot included in the unauthorized copy protection pattern for an image area of a joint portion between adjacent ones of the light emitting device arrays separately from that of the other portions.

In a third aspect of an embodiment, in addition to the above-mentioned second aspect, the control part controls a size of an isolated dot for each divided image area separately from another divided image area, obtained from dividing in the main scan direction a given image, other than the joint portions.

In a fourth aspect of an embodiment, in addition to any one of the above-mentioned first through third aspects, a setting part is provided to externally set widths of the divided image areas.

In a fifth aspect of an embodiment, in addition to any one of the above-mentioned first through third aspects, a setting part is provided to externally set the number of divisions of the divided image areas.

In a sixth aspect of an embodiment, in addition to any one of the above-mentioned first through third aspects, a setting part is provided to set externally a reference pixel pattern used for recognizing an isolated dot included in the unauthorized copy protection pattern.

In a seventh aspect of an embodiment, in addition to the above-mentioned sixth aspect, an adjusting part is provided to adjust a manner of correcting each pixel included in an isolated dot included in the unauthorized copy protection pattern.

In an eighth aspect of an embodiment, in addition to the above-mentioned seventh aspect, the adjusting part has an output control part configured to control output of a light emitting device corresponding to each pixel included in the isolated dot.

In a ninth aspect of an embodiment, in addition to the above-mentioned seventh aspect, the adjusting part has a transfer rate control part configured to control a transfer rate of image data to a light emitting device corresponding to each pixel included in the isolated dot.

In a tenth aspect of an embodiment, in addition to the above-mentioned seventh aspect, an output control part configured to control output of a light emitting device corresponding to each pixel included in the isolated dot, a transfer rate control part configured to control a transfer rate of image data to the light emitting device; and a selecting part configured to select either one of the output control part and the transfer rate control part, are provided. The selecting part selects either one of the output control part and the transfer rate control part depending on whether a binary mode or a multi-level mode is used. The adjusting is carried out with the use of one of the output control part and the transfer rate control part, selected by the selecting part.

An image forming apparatus may include the optical writing apparatus according to any one of the above-mentioned first through tenth aspects.

According to an eleventh aspect of an embodiment, an unauthorized copy protection pattern is superposed on given image data, and optical writing is carried out on a photosensitive body with the use of a light emitting device array. A matrix generating step is carried out to generate an image matrix from the image data in which the unauthorized copy protection pattern has been thus superposed on given image data, with the use of line memories. A pattern recognizing step is carried out to read the image matrix generated in the matrix generating step to recognize the unauthorized copy protection pattern. A control step is carried out, when thus recognizing the unauthorized copy protection pattern in the pattern recognizing step, to control a size of the entirety of an isolated dot of the unauthorized copy protection pattern by controlling a light amount of each light emitting device in pixel unit. Further, the control step divides a given image in a main scan direction, and controls a size of an isolated dot of the unauthorized copy protection pattern separately for each of the thus-obtained divided image areas.

According to a twelfth aspect of an embodiment, an unauthorized copy protection pattern is superposed on given image data, and optical writing is carried out on a photosensitive body with the use of a light emitting device array. A storing step is carried out to store every n lines of the image data. A matrix generating step is carried out to generate an image matrix of n×n (n denotes an integer equal to or more than 2) with the use of the image data stored in the storing steps A control step is carried out to check image data of the image matrix generated by the matrix generating step to recognize the unauthorized copy protection pattern. The control step corrects the image data of the unauthorized copy protection pattern in pixel units when thus recognizing the unauthorized copy protection pattern. The control step thus controls a size of an isolated dot of the unauthorized copy protection pattern. Further, the control step divides a given image in a main scan direction, and controls a size of an isolated dot of the unauthorized copy protection pattern separately for each of the thus-obtained divided image areas.

In a thirteenth aspect of an embodiment, in addition to the above-mentioned eleventh or twelfth aspect of the embodiment, a plurality of light emitting device arrays, each having a width shorter than a size of A0 paper to which an image written on the photosensitive body is transferred, are arranged in such a manner that the light emitting device arrays overlap each other along the main scan direction. Optical writing is carried out for a writing width of an A0 size, The control step controls a size of an isolated dot included in the unauthorized copy protection pattern for an image area of a joint portion between adjacent ones of the light emitting device arrays separately from that of the other portions.

In a fourteenth aspect of an embodiment, in addition to the above-mentioned thirteenth aspect of the embodiment, the control step controls a size of an isolated dot for each divided image area separately from another divided image area, other than the joint portions.

It is noted that, the above-mentioned light emitting device array corresponds to an LPH1 (503-1), an LPH2 (503-2) and an LPH3 (503-3). The storing part corresponds to line memories 501-21. The matrix generating part corresponds to an image matrix generating part 501-32. The control part corresponds to a CPU 302-1, a pattern recognizing and output image generating part 501-33. The setting part for externally setting information corresponds to the CPU 302-1, an operating part 400 and registers realized by a RAM 302-3. The output control part corresponds to an LPH control circuit 502. A transfer rate control part corresponds to a delay control and LPH transfer part 502-3. A selecting part corresponds to the CPU 302-1 and registers realized by the RAM 302-3.

In an embodiment, an image area is divided in a main scan direction, and a size of an isolated dot included in an unauthorized copy protection pattern is controlled separately for each of the thus-obtained divided image areas. Thereby, it is possible to make uniform sizes of respective isolated dots included in the unauthorized copy protection pattern. Thus, it is possible to improve an unauthorized copy protection pattern recognition rate.

An embodiment 1 will now be described.

Figure 1B:
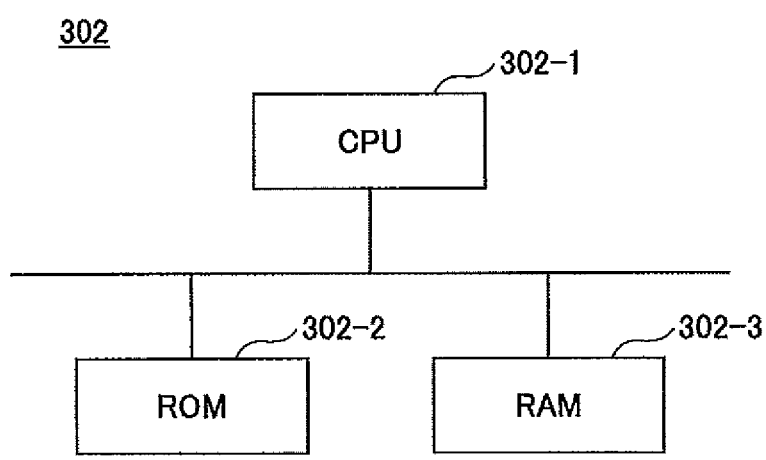
FIG. 1B shows a block configuration example of a system control unit shown in FIG. 1A.

FIG. 1A shows a block diagram of a general configuration of an image forming apparatus in the embodiment 1. As shown in FIG. 1A, the image forming apparatus includes an original reading part 100 reading image information from an original (i.e., an original manuscript or such, the same hereinafter), an image information storing part 300 storing the image information of the original, a copying unit 200 carrying out a series of processes to transfer the image information on transfer paper, a writing part 500 writing an image onto a photosensitive body to be then transferred to the transfer paper, a system control unit 302 controlling the above-mentioned parts/components, and an operating part 400 used by a user for inputting information to the system control unit 302 with the use of a keyboard or such. FIG. 1B shows an internal configuration of the system control unit 302. As shown in FIG. 1B, the system control unit 302 includes the CPU 502-1 carrying out various operation processes, and ROM 302-2 and RAM 302-3 storing various sorts of information to be processed by the CPU 302-1, programs carried out by the CPU 302-1, and so forth.

Figure 2:
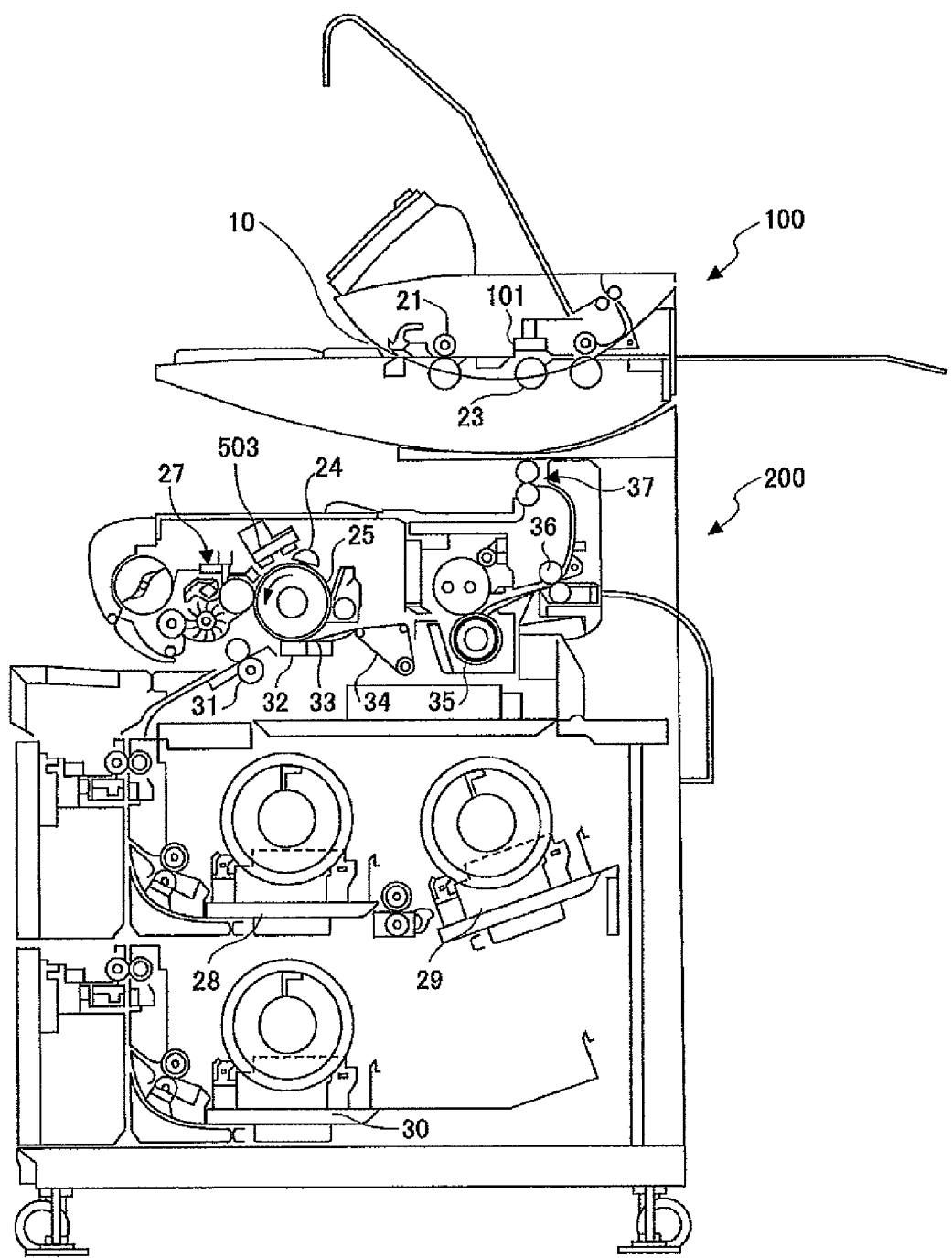
FIG. 2 shows a mechanical configuration of the image forming apparatus in the embodiment 1.

FIG. 2 shows a mechanical configuration of the image forming apparatus in the embodiment 1. The image forming apparatus 200 includes the copy unit 200 and the image reading part 100. The image reading part 100 is mounted on a top of the copy unit 200, and both are integrated together. In the copy unit 200, an image forming part in an upper part and a paper feeding part in a lower part, are included.

When a user inserts an original to the image reading part 100 from an inserting hole 10, the original is conveyed through between a contact image sensor (i.e., CIS) 101 and a white roller 23 as a roller 21 rotates. During conveyance, the original has light applied thereto by means of an LED device mounted on the CIS 101. Reflected light is then focused onto the CIS 101, and thus, the original image information is read.

As shown in FIG. 1A, the CIS 101 converts the focused original image into an analog signal, which is then amplified by an image amplifying circuit 102. An A/D converting circuit 103 converts the thus-amplified image signal into a multi-level digital image signal. The digital image signal is then output in synchronization with a clock signal output from a synchronization control circuit 106. Then, digital image information represented by the digital image signal is processed by a shading correcting circuit 104, whereby a distortion caused by a light variation amount in the LED device, sensitivity variation in the CIS 101, and so forth, is corrected. The digital image information thus corrected by the shading correcting circuit 104 is converted into digital recording image information by means of an image processing circuit 105, and then is written in an image memory part 301 provided in an image information storing part 300. Further, a reading control circuit 107 controls a synchronization control circuit 106 and so forth included in the reading part 100. A scanner driving circuit 108 drives and controls motors rotating the roller 21, the white roller 23 and so forth included in the reading part 100.

The system control unit 302 controls the writing part 500 and the copy unit 200, and controls a series of processes for writing an image on the photosensitive body according to the image information written in the image memory part 301, and then, transferring the image to transfer paper. The writing part 500 carries out optical writing of an image in the copy unit 200. In further detail, the system control unit 302 carries out overall control of the image forming apparatus. Thus, the system control unit 302 controls the reading control circuit 107, the synchronization control circuit 106, the image memory part 301, the image converting part 501, and the LPH control circuit 502, which carry out image data transfer operations and image data processing operations. Further, the system control unit 302 controls the driving control circuit 505 which then in turn controls the scanner driving circuit 303 and the printer driving unit 303 which then in turn drives various motors so that the original and the transfer paper can be properly conveyed. An image delay memory 504 is a delay memory used when the LPH control circuit 502 carries out control operation. As mentioned above, the system control unit 302 has the CPU 302-1. The CPU 302-1 executes a program written in the ROM 302-2 or the RAM 302-3, which are computer readable information recording media, and are also included in the system control unit 302. Thus, the CPU 302-1 carries out the above-mentioned control operation.

The control operation of the CPU 302-1 includes a control operation of controlling the image memory 301 and so forth to superpose an unauthorized copy protection pattern on given image data representing an image to be printed by means of the copy unit 200. The control operation to superpose an unauthorized copy protection pattern is, for example, a control operation for performing operation to superpose an unauthorized copy protection pattern on image data as a copy preventing pattern by means of a secret numbering function which is a well-know art (see Japanese Patent No. 3078433, paragraph 0024). As a specific configuration example required for performing the operation to superpose an unauthorized copy protection pattern on image data, the above-mentioned well-known art can be used for example. Therefore, detailed description thereof is omitted. With the use of a register which can be externally set, for example, it may be set whether the operation to superpose an unauthorized copy protection pattern on image data is actually carried out. Further, the control operation of the CPU 302-1 includes a control operation, described later, to recognize an isolated dot included in an unauthorized copy protection patter, and correct the isolated dot, which operation is actually carried out by an unauthorized copy protection pattern correcting part 501-3 and so forth, described later, under the CPU 302-1 of the control of the system control unit 302.

The writing part 500 receives an image signal transferred with a synchronization clock signal in the image converting part 501, and transfers it to the LPH control circuit 502 as it is. Alternatively, the image signal undergoes density conversion and then, is provided to the LPH control circuit 502. The LPH control circuit 502 divides the received image signal into an image signal for the LPH1 (503-1), an image signal for the LPH2 (503-2), and an image signal for the LPH3 (503-3). Further, the LPH control circuit 502 carries out image correction on image data represented by the received image signal. The LPH1 through LPH3 (503-1 through 503-3) convert the image data into infrared light, and output the infrared light. The image data thus converted into the infrared light and output is provided to the copy unit 200.

Next, a configuration of the copy unit 200 is described with reference to FIG. 2. An electricity charging unit 24 shown in FIG. 2 is a charging unit called a scorotron charger, with a grid, for uniformly charging the drum shaped photosensitive body 25 acting as an image carrier at −2500 V. The photosensitive body 25 is rotated by a motor not shown. The LPHs 503 are configured such that the LPH1 through LPH3 (503-1 through 503-3) are arranged along a main scan direction, and a plurality of LED devices are arranged in array shapes in the main scan direction. Based on image information provided by the LPH control circuit 502, the LED devices of the LPH1 through LPH3 (503-1 through 503-3) emit light, and the light is then applied to the photosensitive body 25 via a SELFOC (registered trade name) lens array which is an optical device.

When the photosensitive body 25 is thus exposed to the light applied based on the digital image information from the LPH1 through LPH3, a photoelectric phenomenon causes a charge on a surface thereof to flow to the ground. The LPH1 through LPH3 emit a large amount of light with the LED devices for a part at which an original is dark while the LPH1 through LPH3 emit a smaller amount of light for a part at which the original is light. By such a manner of control, an electrostatic latent image having image parts, corresponding to dark parts and light parts of the original, is formed on the photosensitive body 25. The electrostatic latent image thus formed on the photosensitive body 25 is then developed by a developing unit 27, into a toner image. The developing unit 27 is configured such that, in the inside, toner is stirred, so that the toner is charged negatively. There, −700 V is applied as a bias. Thereby, the toner adheres only to a part to which light is thus applied.

Transfer paper acting as a sheet like recording medium is fed to a registration roller 31 selectively from three paper feeding tables 28, 29, 30 and a manual feeding part. The transfer paper is then fed in predetermined timing by means of the registration roller 31, to pass below the photosensitive body 25. At this time, a transfer charger 32 as a transfer means transfers the toner image formed on the photosensitive body 25 to the transfer paper. The transfer paper is then removed from the photosensitive body 25 by means of a removing charger 33, and then, is fed to a fixing unit 35 by means of a conveying belt 34. The toner on the transfer paper is fixed by means of the fixing unit 35. The transfer paper is then ejected to the outside of the image forming apparatus by means of ejecting rollers 36, 37.

Figure 3:
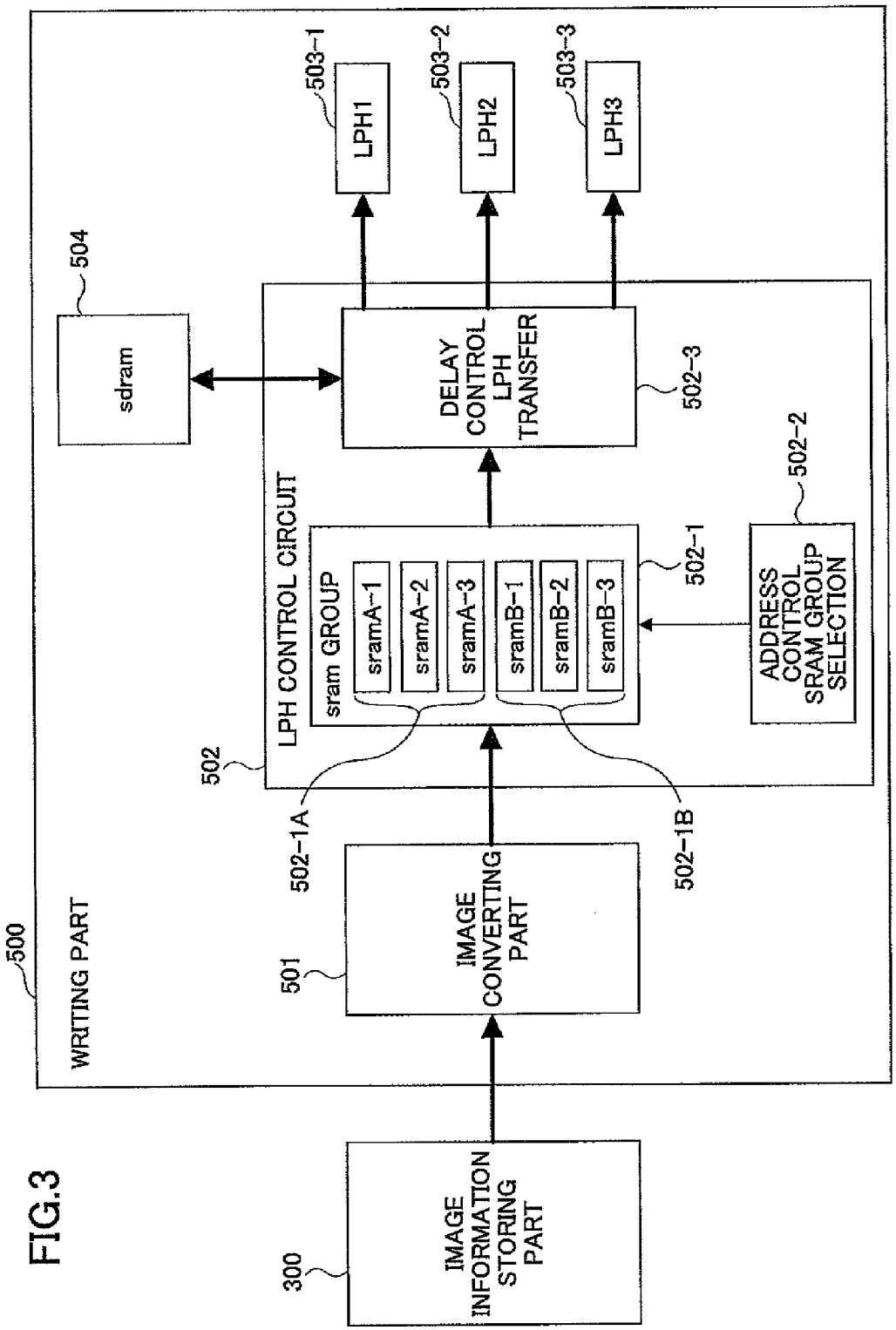
FIG. 3 shows a block diagram of a flow of image data in a writing part shown in FIG. 1A.

FIG. 3 shows a block diagram showing a flow of image data in the writing part 500. In FIG. 3, the writing unit 500 includes the image converting part 501, the LPH control part 502, the LPH1 through LPH3 503-1 through 503-3 (simply referred to as LPHs hereinafter) and an SDRAM 504.

The writing part 500 carries out data replacement in a data flow as follows:

1) First, from the image information storing part 301, image data 301-1 (see FIG. 4) of even-numbered pixels (referred to as EVEN, hereinafter) and odd-numbered pixels (referred to as ODD, hereinafter) are provided simultaneously.

2) The thus-provided image data undergo image correction as is necessary in response to a result of pattern recognition (also referred to as pattern matching), in the image converting part 501.

3) Next, the LPH control circuit 502 divides the image data (i.e., in this case, line data in the main scan direction) provided from the image converting part 501 and writes the thus-divided image data in three A-group SRAMs (502-1A) of an image data RAM part 502-1.

4) Next, a line of image data thus written in the three A-group SRAMs 502-1A is read simultaneously.

5) During the time when the image data are read from the A-group SRAMs 502-1A, a second line of image data is written in three B-group SRAMs 502-1B. That is, a so-called toggling operation is carried out. Selection of the SRAM groups 502-1 is carried out by an address control part 502-2.

6) Image data, corresponding to the respective LPHs, thus read from the SRAMs 502-1 is once transferred to the SDRAM 504, and then, is read again. The LPH1 through LPH3 503-1 through 503-3 shift in a sub-scan direction according to a predetermined mechanical layout thereof. That is, the LPHs are disposed in a staggered manner (see FIGS. 21, 22). Therefore, the LPH1 503-1 is used as a benchmark, while, image data for the LPH2 503-2 and the LPH3 503-3 are read with a delay corresponding to the sift amount of the LPHs. Such a manner of reading is carried out by a delay control and LPH transfer part 502-3. The image delay memory 504 shown in FIG. 1A corresponds to the SDRAM 504 shown in FIG. 3.

7) Finally, the delay control and LPH transfer part 502-3 transfers image data to the LPH1 through LPH3 503-1 through 503-3.

Figure 4:
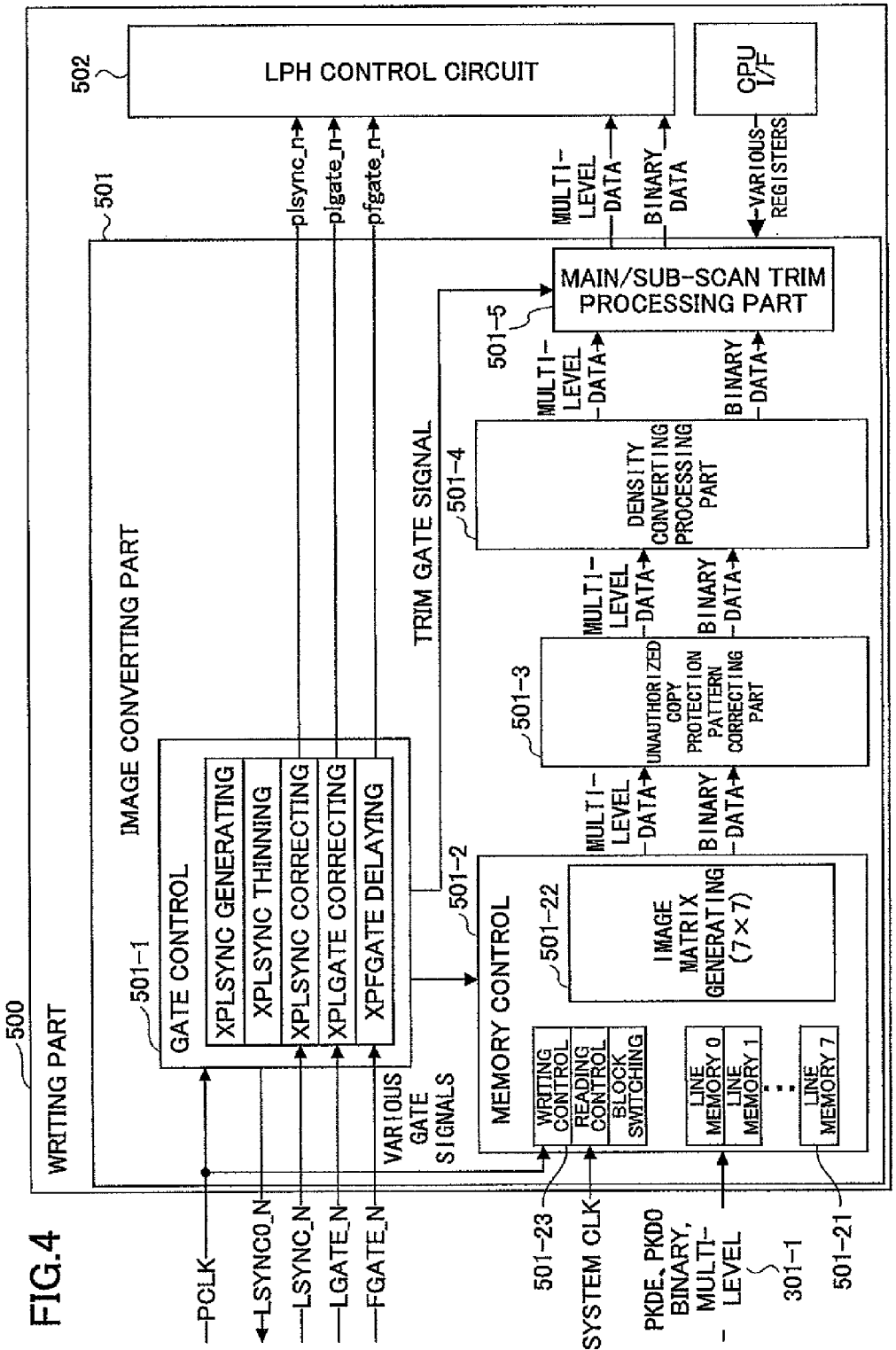
FIG. 4 shows a block diagram of a configuration of the writing part.

The image converting part 501 includes, as shown in FIG. 4, a GATE control part 501-1, a memory control part 501-2, an image recognizing part (i.e., an unauthorized copy protection pattern recognizing part) 501-3, and a main/sub trim processing part 501-5. Respective density converting modes (i.e., image outputting modes) in the image converting part 501 may be set externally and freely with the use of a register dense_r [2:0]. FIG. 5 shows the respective density converting modes set by means of the register dense_r [2:0], and shows matrix sizes for the respective modes, described later. The density converting modes include a 'through mode' in which no image processing is carried out (i.e., ordinary outputting mode), an 'equal density mode', a 'two-times density mode', a 'three-times density mode', and a '1.5-times density mode'.

The GATE control part 501-1 generates LSYNC_0 to be provided to the image information storing part 300. LSYNC_0 is set separately for each of the through mode, the equal density mode, two-times density mode or three-times density mode, and the 1.5-times density mode, of the above-mentioned density converting modes. LSYNC provided by the image information storing part 300 is thinned in the modes in which image density is converted. Therefore, interpolation should be carried out before LSYNC is provided to the LPH control circuit 502. The GATE control part 501-1 carries out a process for this purpose. Also the GATE control part 501-1 generates dummy FGATE.

The memory control part 501-2 generates line groups arranged in the sub-scan direction of an image matrix, according to the selected density converting mode. Main operation of the memory control part 501-2 is described below.

(a) The following operation is carried out for two pixels of EVEN and ODD in parallel:

Mask data are written, reading from the line memories 501-21 is carried out, and writing to the line memories 501-21 is carried out. The mask data means data such that a pixel value is 0.

Specifically, image data of 21600 dots which corresponds to the number of pixels for one line are written in each of the line memories 5-1-21 having addresses 0 through 10799 and a width of 5 bits, every PLSYNC_N.

When there is no assertion of PFGATE_N and PLGATE_N, mask data are written in the line memories 501-21.

When assertion of PLGATE_N does not occur during 32 clock pulses from PLSYNC_N, writing to the line memories 501-21 is forcibly started.

Thereby, before assertion of PFGATE_, the eight line memories 501-21 are filled with the mask data (=0).

(b) During PFGATE_N and PLGATE_N being enabled, image data are written instead of mask data.

(c) Data being read from the line memories 501-21 is carried out every plsync_n (having intervals of 600 dpi as a result of interpolation of PLSYNC_N).

A size of an image matrix used for each density converting mode (i.e., magnification) is as shown in FIG. 5.

In the above-mentioned equal density mode (also referred to as a printer output mode), or the above-mentioned through mode (also referred to as an ordinary image output mode), an image matrix generating part 501-22 of the memory control part 501-2 generates line groups used for a 7×7 pixel image matrix. When an unauthorized copy protection pattern correcting function described below is set valid, the above-mentioned line groups are transferred to a next block, i.e., an unauthorized copy protection pattern part 501-3. Otherwise, the line groups are provided to a density converting processing part 501-4. In the 1.5-times density mode, as shown in FIG. 5, three different image matrixes (i.e., 2×2, 6×2 and 4×3) are generated. After that, in each mode, a necessary image matrix is used. For the purpose of simplification of explanation, an image matrix used for unauthorized copy protection pattern correction is assumed simply to be a 7×7 pixel image matrix, hereinafter.

Figure 6:
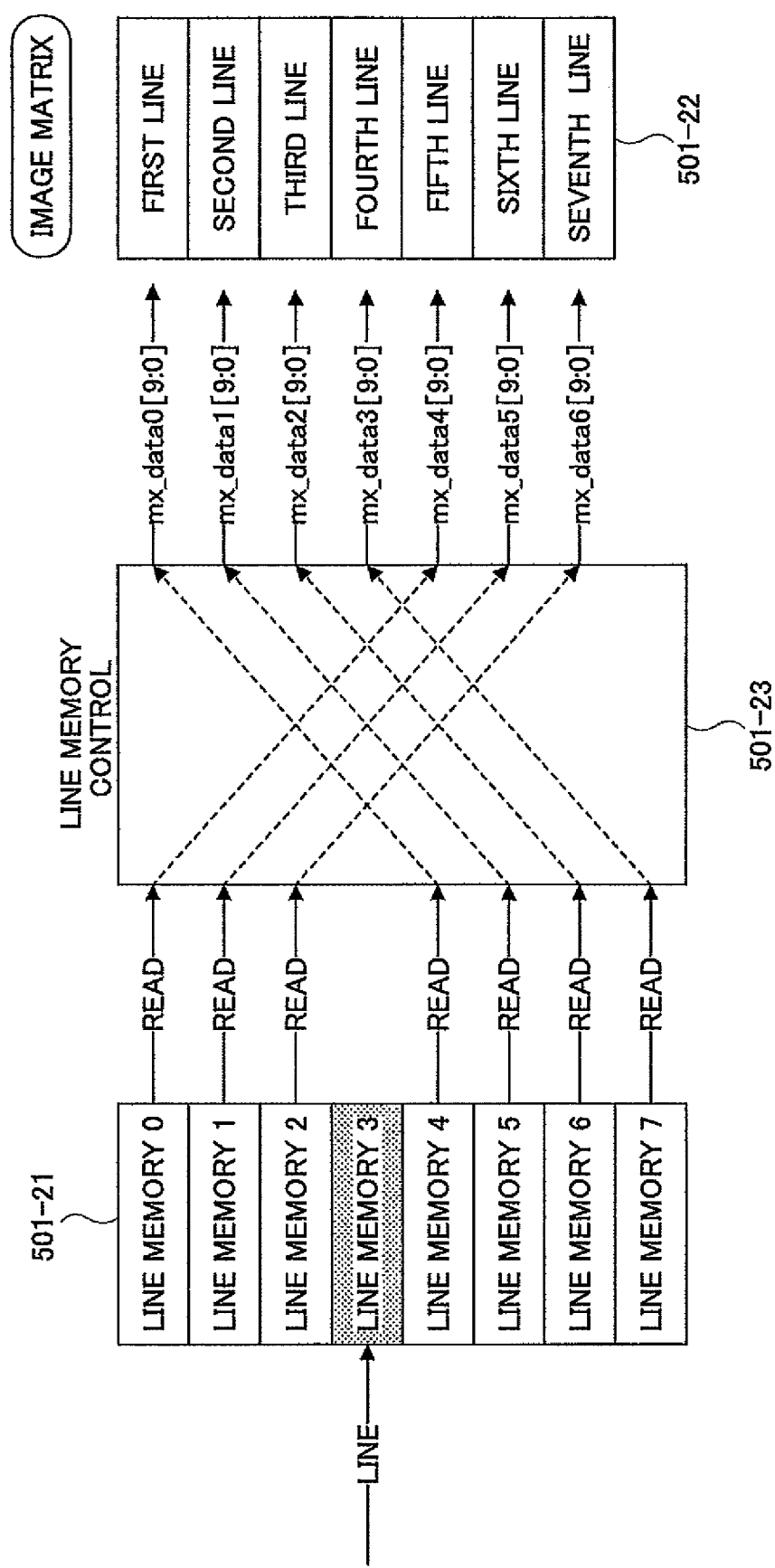
FIG. 6 shows a control configuration of read/write operation of a line memory.
Figure 7B:
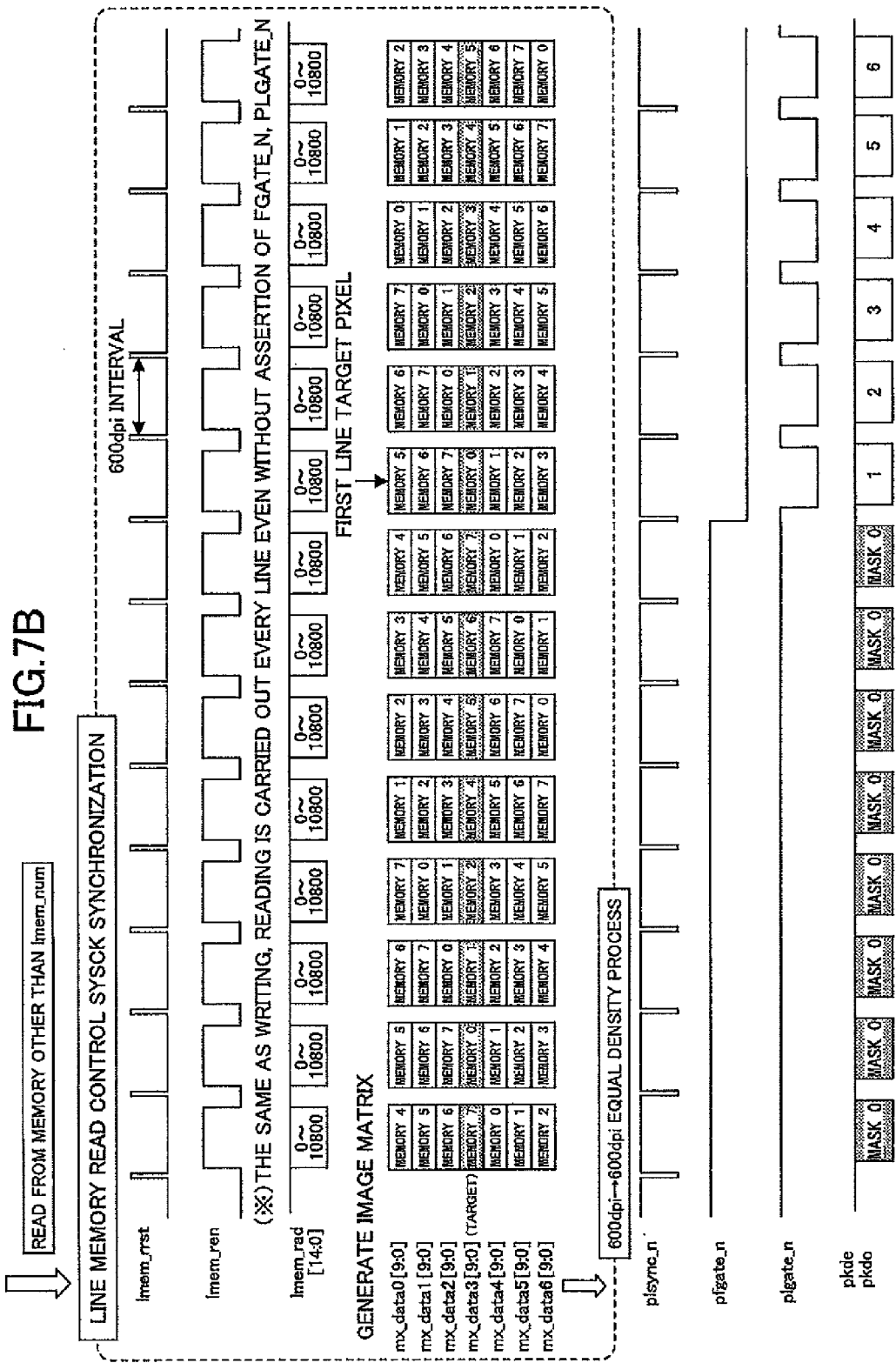

A line memory control part (having functions of writing, reading and block switching) 501-23 carries out an operation of reading from and writing to the line memories 501-21. As shown in FIG. 6, writing is carried out to one (line memory 3 in a case of FIG. 6) of the eight line memories. Line data is read from the other seven line memories, and thus, 7 lines of image data for being arranged in the sub-scan direction are provided for an image matrix. FIGS. 7A and 7B show a detailed timing chart for the 1s memory reading/writing operation.

Figure 8:
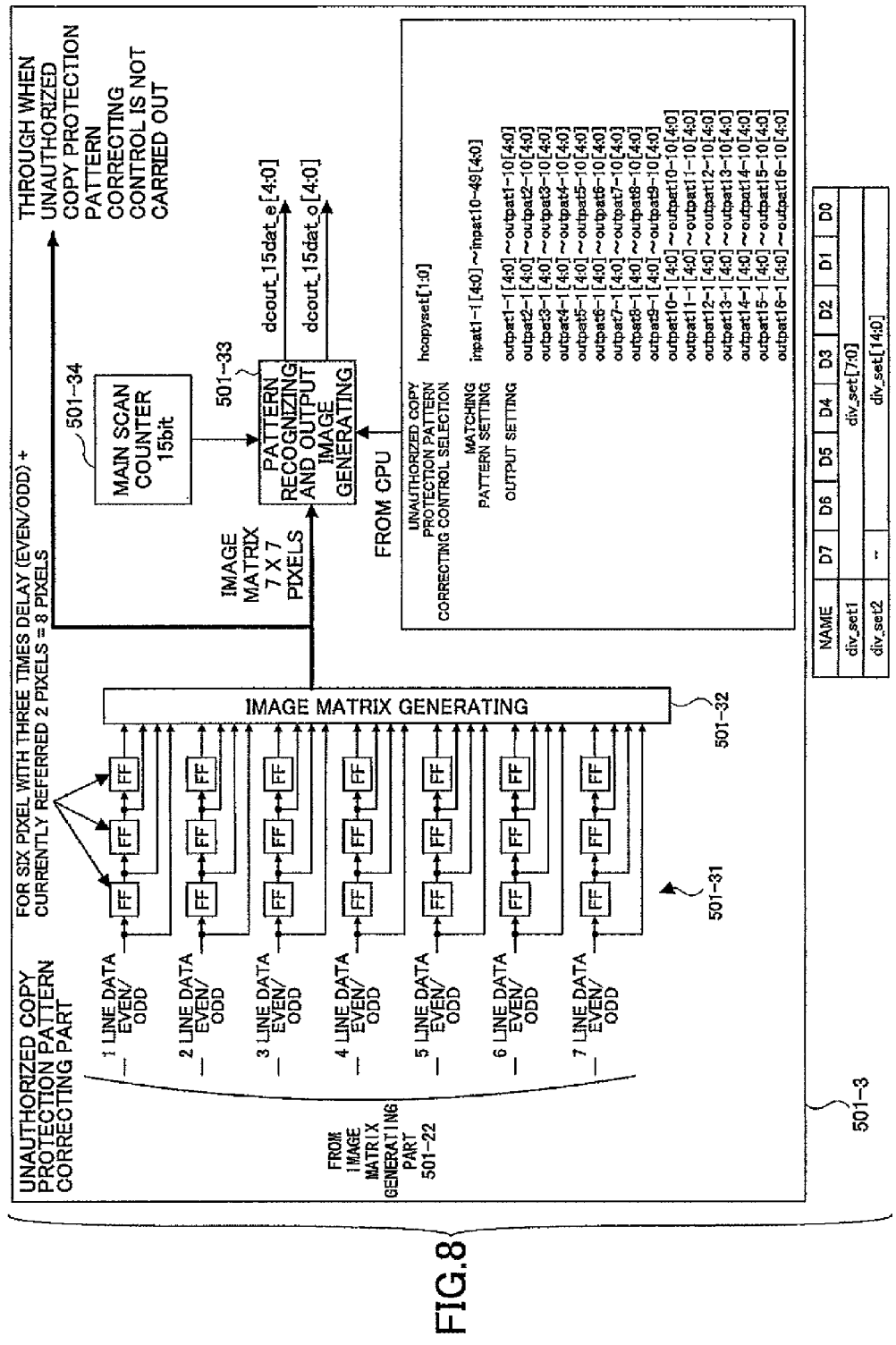
FIG. 8 shows a block diagram in detail of an unauthorized copy protection pattern correcting part.

FIG. 8 shows a block diagram showing details of the unauthorized copy protection pattern correcting part 501-3. The unauthorized copy protection pattern correcting part 501-3 reads an image matrix generating part register (i.e., hcopyset [1:0], which can be freely set externally), and determines whether the unauthorized copy protection pattern correcting function is valid, and whether a binary mode or a multi-level mode is used. When it is determined that the unauthorized copy protection pattern correcting function is valid, an unauthorized copy protection pattern superposed on image data is recognized. That is, first, an image matrix is generated with the use of image data of 1 through 7 lines obtained from the image matrix generating part 501-22. Next, pattern recognition is carried out on the thus-obtained image matrix. When an unauthorized copy protection pattern is actually found out as a result of the above-mentioned pattern recognition, correction is carried out on the thus-found unauthorized copy protection pattern. Details of the correction will be described later, and an operation flow will be described later with reference to FIG. 28. The unauthorized copy protection pattern correcting part 501-3 includes a delay part 501-31 including 7 lines each having three FFs, an image matrix generating part 501-32 to which data delayed by the delay part 501-31 are input, a pattern recognition and output image generating part 501-33 and a main scan counter 501-34.

FIG. 9 shows settings in the image matrix generating part register (hcopyset [1:0]). Such a register (i.e., each register including in the image forming apparatus) is actually realized by the ROM 302-3 of the system control unit 302, for example. As shown in FIG. 9, a setting of "1" in the hcopyset [1:0] is for a case where the unauthorized copy protection pattern correcting function is made invalid. A setting of "2" in the hcopyset [1:0] is for a case where the unauthorized copy protection pattern correcting function is made valid, and also, the binary mode is used. A setting of "3" in the hcopyset [1:0] is for a case where the unauthorized copy protection pattern correcting function is made valid and also the multi-level mode is used.

Details of generating a 7×7 pixel image matrix are described now. As shown in FIG. 8, image data for two pixels of EVEN and ODD output from the line memories 501-21 are latched by each FF of the delay part 501-31. In FIG. 8, 'first line once latched data' means data obtained from first line data being once delayed. Similarly, 'first line twice latched data' means data obtained from first line data being twice delayed. Similarly, 'first line thrice latched data' means data obtained from first line data being thrice delayed. As a result, together with two pixels currently read, image data of total 8 pixels can be obtained. Because output of the line memories 501-21 is for eight lines, consequently it is possible to obtain image data of 7×8 pixels simultaneously. In the unauthorized copy protection pattern correcting function, the actual unauthorized copy protection pattern correction is carried out with the use of an image matrix of 7×8 pixels thus generated by the image matrix generating part 501-32. That is, two pixels of EVEN and ODD are processed in parallel, and also, a 7×8 pixel image matrix is obtained as mentioned above. Then, from the 7×8 pixel image matrix, a 7×7 pixel image matrix is extracted having front 7 pixels (i.e., front 7 columns) in the main scan direction. Then, the thus-extracted 7×7 pixel image matrix is used, and a center pixel thereof as a target pixel is corrected. After that, a shift is carried out on the 7×8 pixel image matrix in the main scan direction for one pixel. Thereby, a next 7×7 pixel image matrix is extracted having rear 7 pixels (i.e., rear 7 columns) in the main scan direction. Then, the thus-extracted 7×7 pixel image matrix is used, and a center pixel thereof is corrected. FIG. 10 shows a timing chart for generating the above-mentioned 7×8 pixel image matrix.

Pattern recognition in the embodiment is carried out as follows:

First, a case where image division is performed in the main scan direction is described. A div_set [14:0] register (for example, realized by the RAM 302-3 of the system control unit 302, which is freely set externally) shown in a lower part of FIG. 8, is used to set a divided image area width, and the number of divisions. Assuming that the writing maximum width in the main scan direction is 21600 dots, and a value set in the div_set [14:0] is a divided image area width, the number of divisions is calculated as follows:

$$\text{The number of divisions} = 21600/\text{div\_set}\,[14.0] \qquad (1)$$

That is, the number of divisions is set based on calculation of the above formula (1). When the calculation of the formula (1) is divisible, the number of the divisions is the quotient of the calculation. When the calculation is not divisible, the quotient is rounded up, and thus, the number of divisions is obtained.

FIG. 11 shows an example of main scan image dividing. In FIG. 11, the number of divisions is 5. In this embodiment, the maximum available number of divisions is 16.

Pattern recognition is carried out by the pattern recognizing and output image generating part 501-33 of the unauthorized copy protection pattern correcting part 501-3. A total of 10 matching patterns (also referred to as reference pixel patterns), as shown in FIG. 12, are used, for an image matrix generated by the image matrix generating part 32. These matching patterns are previously set in registers inpat 1-1 [4:0] through inpat 1-49 [4:0] (for example, realized by the ROM 302-3 of the system control unit 302, which can be freely set externally). The total 49 registers inpat 1-1 through inpat 1-49 correspond to respective ones of a total of 49 pixels of a 7×7 pixel matrix generated by the image matrix generating part 501-32, respectively (as shown in a lower part of FIG. 12). In the lower part of FIG. 12, the 7×7 pixel image matrix is shown. The 7×7 pixel image matrix has matrix elements 1 through 49 as shown. These matrix elements correspond to respective pixels included in the image matrix. Respective pixel values corresponding to these pixels are set in the above-mentioned 49 registers inpat 1-1 through inpat 1-49, respectively. The total 10 sets are prepared as mentioned above, and each set includes the 49 registers. As a result, the total 10 matting patterns are prepared. In these ten sets of registers, 10 possible dot patterns for an isolated dot included in an unauthorized copy protection pattern are set, respectively. Actually, these 10 possible dot patterns correspond to ten possible patterns which are different according to where a target pixel is located in the isolated dot. With the use of these dot patterns, pattern recognition is carried out on the given image data to find an isolated dot included in an unauthorized copy protection pattern, and then, the thus-found isolated dot is corrected. Thus, it is possible to particularly correct the unauthorized copy protection pattern, and it is not necessary to correct the entirety of an image represented by image data including the given image data.

Determination as to which one of the above-mentioned ten matching patterns matches a given imaged matrix is carried out by the pattern recognizing and output image generating part 501-33 shown in FIG. 8. After matching is obtained, a target pixel, i.e., a center pixel of the given image matrix, is corrected in such a manner that a corresponding pixel value according the matching result is used to replace the original one. The matching result means a result of the determination as to which one of the above-mentioned ten matching patterns matches the given imaged matrix. The main scan counter 501-34 carries out counting to determine at all times what number in the main scan direction the current target pixel corresponds to. As a result, it is possible to determine which one of the divided image areas (i.e., the divided areas shown in FIG. 11) the target pixel belongs to. When the given 7×7 pixel image matrix matches a matching pattern set in any one of the registers inpat 1-1 [4:0] through 1-49 [4:0], a pixel value of the target pixel is replaced by a pixel value based on a value of an appropriate one of output registers outpat 1-1 [4:0] through outpat 16-10 [4:0]. These output registers, shown in FIGS. 13 through 16, are set to correspond to the above-mentioned 10 matching patterns, and also, correspond to the above-mentioned divided image areas (the maximum number of divisions being 16 as mentioned above). The output registers may be realized by the RAM 302-3 of the system control unit 302 and can be freely set externally. The total 160 (i.e., 16×10=160) output registers outpat 1-1 [4:0] through outpat 16-10 [4:0] are prepared. For example, the first output register outpat 1-1 is used to set a pixel value for a corrected target pixel for when a target pixel belongs to the first one of the above-mentioned divided image areas, and the first one of the above-mentioned ten matching patterns matches the given 7×7 pixels image matrix. Similarly, for example, the last 160th output register outpat 16-10 is used to set a pixel value for a corrected target pixel for when a target pixel belongs to the 16th one of the above-mentioned divided image areas, and the tenth one of the above-mentioned ten matching patterns matches the given 7×7 pixels image matrix.

Assuming that the multi-level mode is used, the pixel value thus obtained from the above-mentioned output register is used for a corrected target pixel, and is provided to the corresponding LPH. Assuming that the binary mode is used, a so-called pseudo multi-level mode method is used to obtain a corrected target pixel. The pseudo multi-level mode method is described now. A target pixel is written twice with shifting in the sub-scan direction. Such a manner will be referred to as 'sub-scan twice putting' hereinafter. With the use of possible combinations of the thus-obtained total two pixel values (each having a binary value, i.e., 0 or 1), the number of gradations more than two directly obtained from the binary number system are available. Because the binary system has two values, 0 and 1, the number of the above-mentioned combinations is 2×2=4. As a result, the total 4 values are available for a pixel value obtained from the sub-scan twice putting. Image data used in the image forming apparatus has such a data structure prepared for the multi-level mode. In the binary mode, only the lower two bits of the data structure are used to obtain the above-mentioned total 4 values for each pixel (i.e., 2 [bits]×2 (of the binary system)=4).

Figure 17:
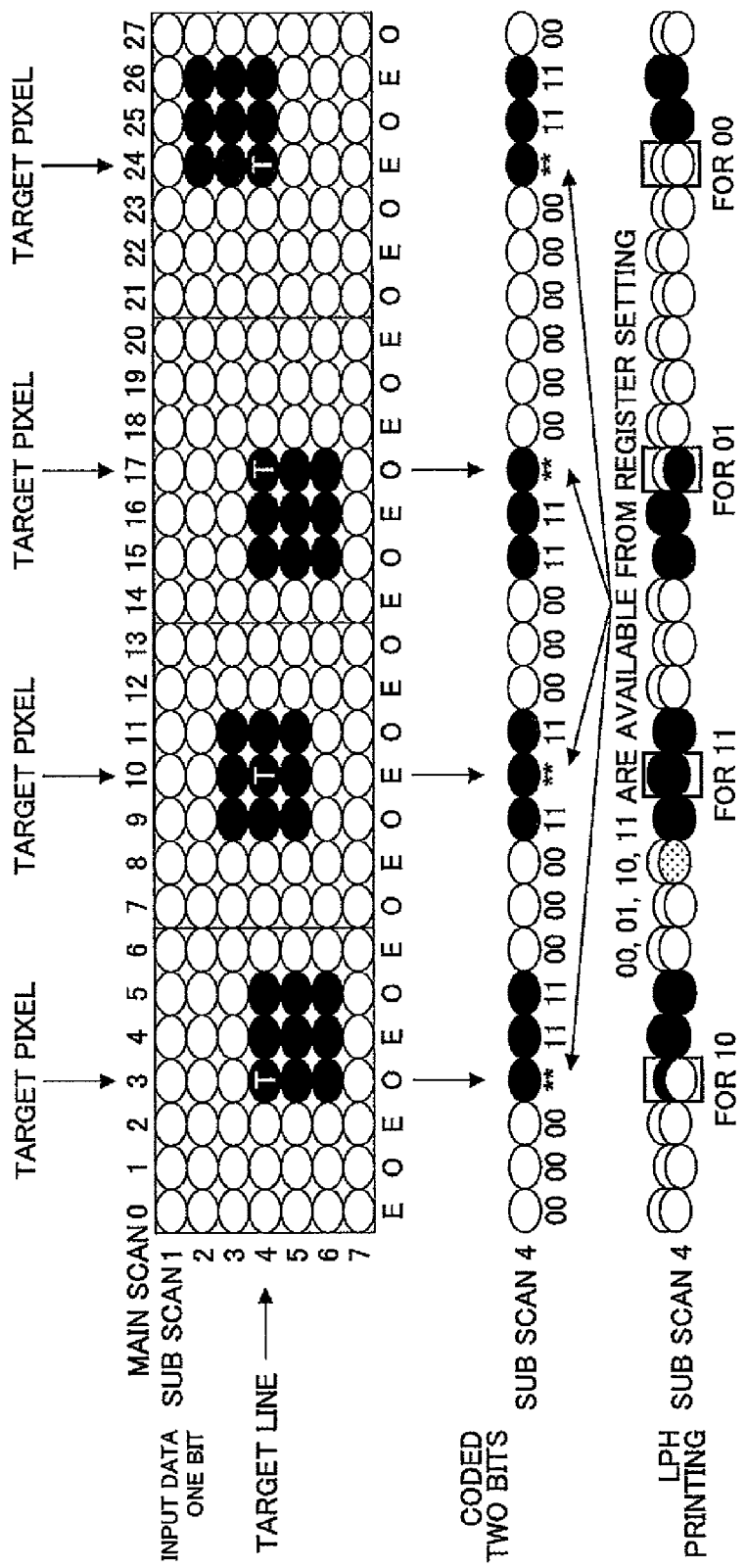
FIG. 17 illustrates unauthorized copy protection pattern correcting operation.

Specifically, as shown in FIG. 17, a lower part, when a pixel value obtained from the above-mentioned output register is 00, writing is not carried out for two lines of the sub-scan twice putting. When a pixel value obtained from the above-mentioned output register is 01, writing is carried out only for the first line (i.e., a pixel value of the line is 1), and writing is not carried out (i.e., a pixel value of the line is 0) for the second line of the sub-scan twice putting. When a pixel value obtained from the above-mentioned output register is 10, writing is not carried out for the first line (i.e., a pixel value of the line is 0), and writing is carried out (i.e., a pixel value of the line is 1) for the second line of the sub-scan twice putting. When a pixel value obtained from the above-mentioned output register is 11, writing is carried out for each of the first and second lines (i.e., each of the respective pixel values of the lines is 1) of the sub-scan twice putting. Thus, in the binary mode, a corrected target pixel, corresponding to two pixels thus obtained from the sub-scan twice putting, to replace an original target pixel, is thus controlled. As a result, the target pixel included in an isolated dot of an unauthorized copy protection pattern is corrected, and thus, an unauthorized copy protection pattern is appropriately corrected.

FIG. 17 illustrates unauthorized copy protection pattern correcting operation in the embodiment. An upper part of FIG. 17 shows the 1st through 7th lines arranged in the sub-scan direction extracted from an image represented by given image data, each line including 0th through 23rd pixels arranged in the main scan direction. In the figure, a black circle represents a black pixel (i.e., a pixel having a pixel value of 1, the same manner holding hereinafter), and a white circle represents a white pixel (i.e., a pixel having a pixel value of 0, the same manner holding hereinafter). In the figure, four collections of black pixels are shown, each collection having 3×3 black pixels, arranged horizontally in the main scan direction. These black pixel collections correspond to respective isolated dots of an unauthorized copy protection pattern in the example. Such an unauthorized copy protection pattern may be a well-known tint block (for example, a copy preventing pattern shown in the above-mentioned Japanese Patent No. 3078433, FIG. 2). FIG. 17 shows a state in which, from given image data, a first image matrix (corresponding to the above-mentioned 7×7 pixel image matrix, the same manner holding hereinafter) of a range of 1st through 7th lines arranged in the sub-scan direction is extracted, each line including 0th through 6th pixels arranged in the main scan direction, including the first isolated dot of the unauthorized copy protection pattern. Then, the thus-obtained first image matrix matches any one of the above-mentioned total ten matching patterns in the above-mentioned pattern recognition. Further, from the given image data, a second image matrix of a range of 1st through 7th lines arranged in the sub-scan direction is extracted, each line including 7th through 13th pixels arranged in the main scan direction, including the second isolated dot of the unauthorized copy protection pattern. Then, the thus-obtained second image matrix matches another one of the above-mentioned total ten matching patterns in the above-mentioned pattern recognition. Further, from the given image data, a third image matrix of a range of 1st through 7th lines arranged in the sub-scan direction is extracted, each line including 14th through 20th pixels arranged in the main scan direction, including the third isolated dot of the unauthorized copy protection pattern. Then, the thus-obtained third image matrix matches further another one of the above-mentioned total ten matching patterns in the above-mentioned pattern recognition. Further, from the given image data, a fourth image matrix of a range of 1st through 7th lines arranged in the sub-scan direction is extracted, each line including 21st through 27th pixels arranged in the main scan direction, including the fourth isolated dot of the unauthorized copy protection pattern. Then, the thus-obtained fourth image matrix matches further another one of the above-mentioned total ten matching patterns in the above-mentioned pattern recognition. FIG. 17 shows a state, for the purpose of convenience of explanation, when the above-mentioned four times of matching occur simultaneously. However, actually in the pattern recognition, the image matrixes are extracted one by one in sequence, and a comparison is made each time with the matching patterns (see FIG. 28). Therefore, the above-mentioned four times of matching actually occur one by one in sequence and not simultaneously in the embodiment.

Figure 29:
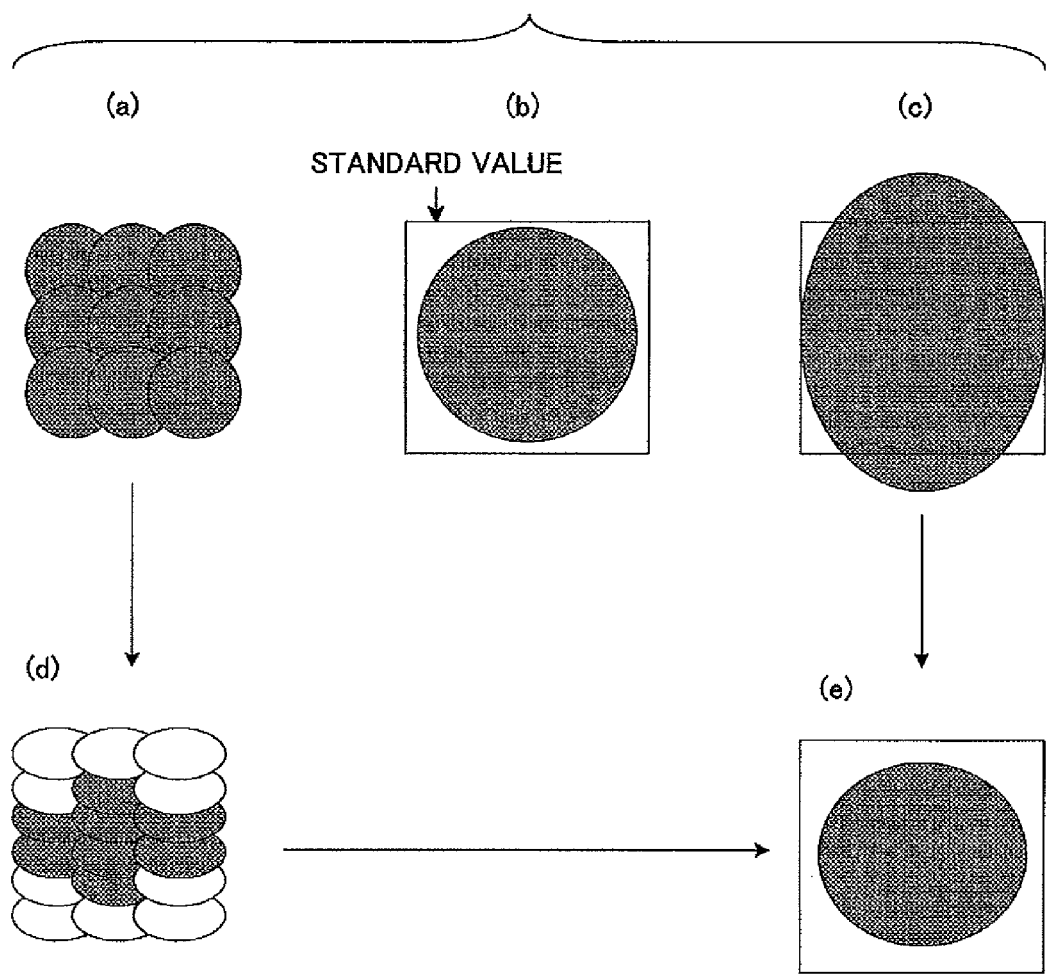
FIGS. 29 and 30 illustrate specific examples of unauthorized copy protection pattern correcting operation.
Figure 30:
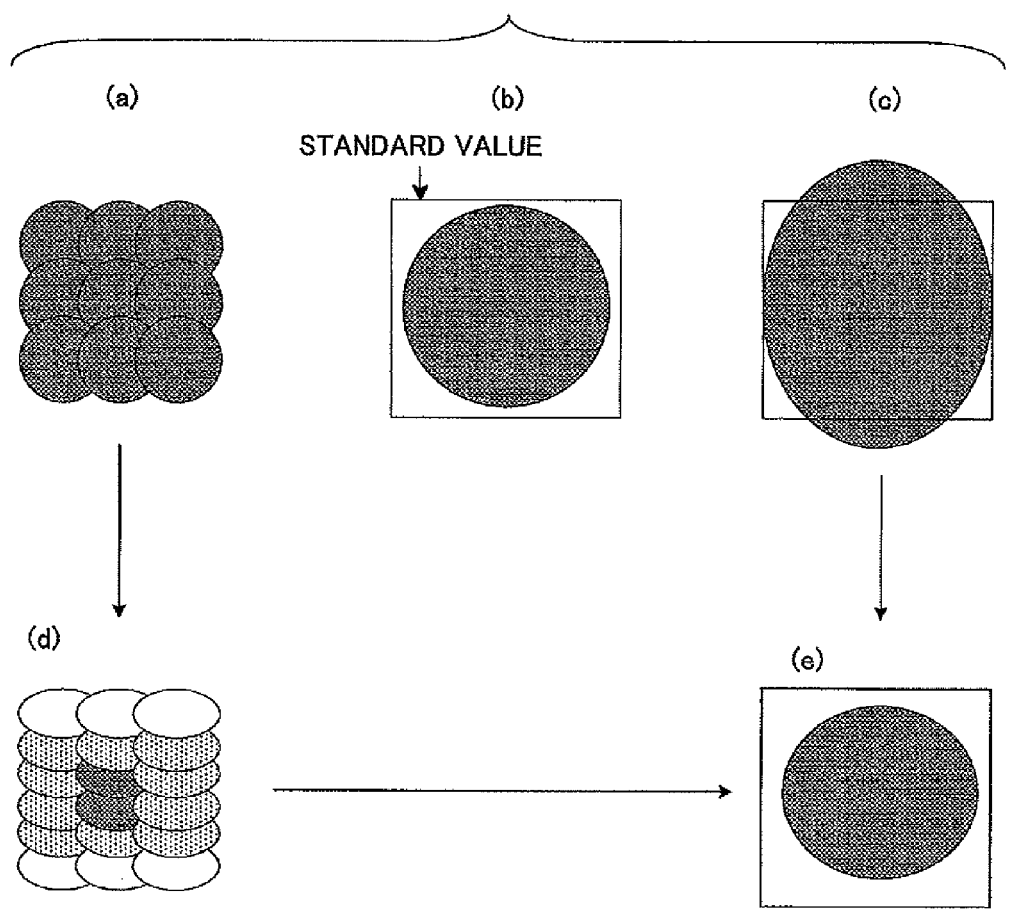

As shown in FIG. 17, only a target pixel, included in an isolated dot, is corrected. Thus, correction of an isolated dot included in an unauthorized copy protection pastern is carried out in pixel units. As shown in FIG. 17, the target pixel corresponds to a pixel located precisely at a center of 7×7 pixels included in an image matrix. In the upper part of FIG. 17, "T" is given to each target pixel (the same manner holding hereinafter). In an example of FIG. 17, correction of an isolated dot of an unauthorized copy protection pattern is carried out in such a manner that a pixel located in the periphery of the isolated dot is apparently changed in its gradation. In such a manner of correction, as shown in FIGS. 29 and 30 described later, the size of the isolated dot included in the unauthorized copy protection pattern is apparently reduced, so that the isolated dot can satisfy the above-mentioned standard for unauthorized copy protection patterns, and thus, the corresponding unauthorized copy protection pattern can be positively recognized by a second image processing apparatus. Thereby unauthorized copy protection function can actually work well. Specifically, in the example of FIG. 17, a target pixel of the above-mentioned first isolated dot, located in the 4th line in the sub-scan direction and at the 3rd pixel in the main scan direction, is a peripheral pixel of the first isolated dot. As mentioned above, the peripheral pixel of the isolated dot should be reduced in its gradation to apparently reduce the size of the corresponding isolated dot. Actually, as shown in the lower part of FIG. 17, for the corresponding pixel, a second line is not written (i.e., a white pixel occurs there) in the sub-scan twice putting to apparently reduce the gradation of the target pixel.

Figure 18:
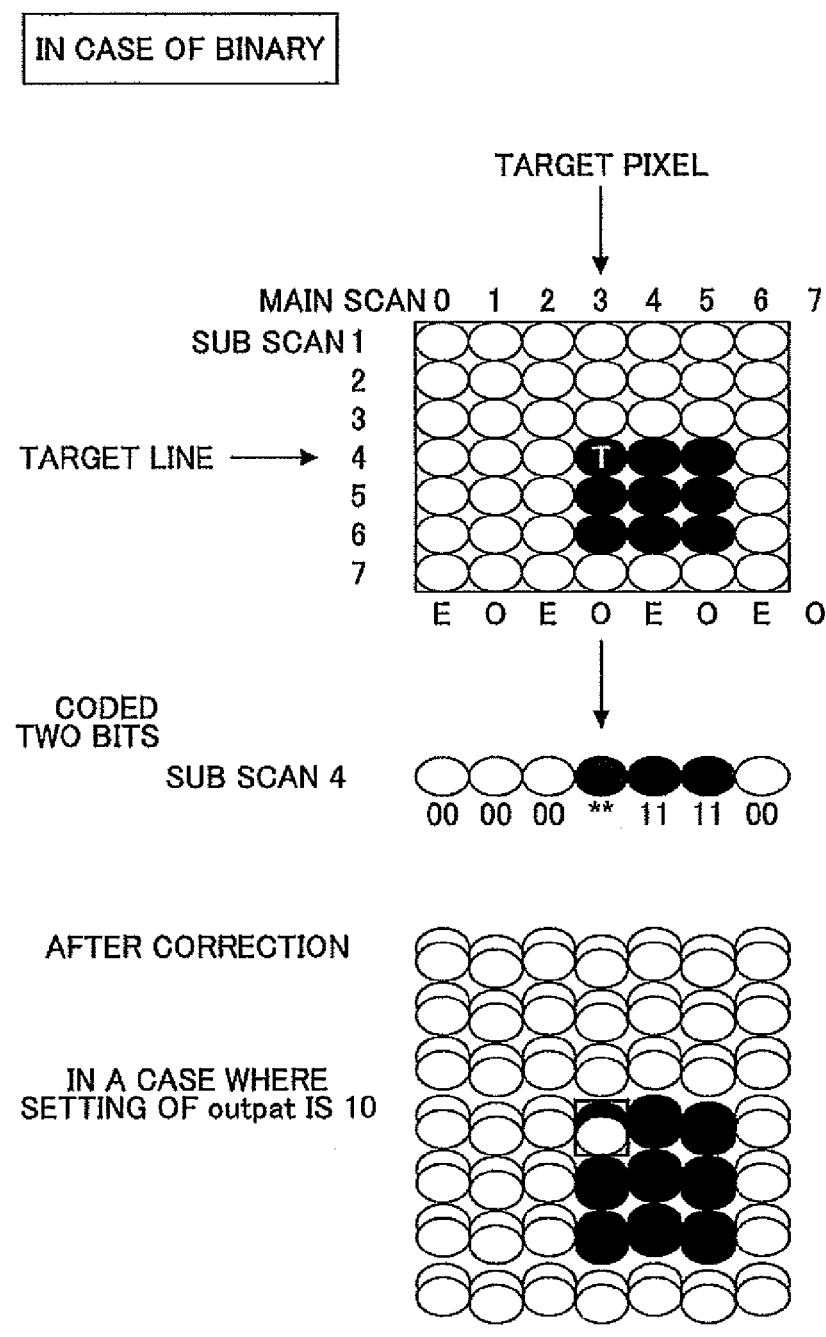
FIG. 18 shows correction of an unauthorized copy protection pattern in a binary mode.

FIGS. 18 and 19 show respective cases of the binary mode and the multi-level mode. In these figures, as the above-mentioned matching pattern, in binary mode shown in FIG. 18, "1" is set in each of the above-mentioned registers inpat 1-25 through 1-27, inpat 1-32 through 1-34, and inpat 1-32 through 1-41, while "0" is set in each of the other registers. Correspondingly, in the thus obtained matching pattern, as shown in an upper part of FIG. 18, in a 7×7 pixel image matrix, 25th through 27th, 32nd through 34th, and 39th through 41st (see FIG. 12, lower part), are black pixels, while the other pixels are white pixels. Further, in this example, it is assumed that, as shown in FIG. 18, upper part, in an image matrix extracted from given image data, an isolated dot occurs having 3×3 black pixels in a range of 4th through 6th in the sub-scan direction and 3rd through 5th in the main scan direction. As a result, the image matrix extracted from the given image data is matched by the above-mentioned matching patterns. That is, when the image matrix extracted from the given image data is of a range of 0th through 7th in the sub-scan direction and 0th through 6th in the main scan direction as shown in FIG. 18, upper part, the image matrix is matched by the above-mentioned matching pattern. In this case, as shown in FIG. 18, lower part, a target pixel of the image matrix, i.e., a pixel of 4th line in the sub-scan direction and 3rd in the main scan direction, is corrected. The same manner holds in a case of FIG. 19. However, in the case of FIG. 19, because the multi-level mode is used, "1f" is set in each of the above-mentioned registers inpat 1-25 through 1-27, inpat 1-32 through 1-34, and inpat 1-32 through 1-41, while "0" is set in each of the other registers. As the above-mentioned output registers for setting a pixel value of a corrected target pixel, one thereof is selected corresponding to a divided image area to which the corresponding target pixel belongs. It can be seen from FIGS. 18 and 19, in the embodiment, pattern recognition is carried out with the use of an image matrix extracted from given image data, as well as previously provided matching patterns for an isolated dot included in an unauthorized copy protection pattern. Thereby, the isolated dot of the unauthorized copy protection pattern is found from image data in which the unauthorized copy protection pattern has been superposed on given image data, and a pixel included in the isolated dot is corrected to control the size of the isolated dot. Thus, it is possible to control only the unauthorized copy protection pattern superposed on the given image data without influencing the image represented by the given image data. Thus, it is possible to effectively control an unauthorized copy protection pattern superposed on given image data, and thus, it is possible that the unauthorized copy protection function positively works well.

The density converting processing part 501-4 subsequent to the unauthorized copy protection pattern correcting part 501-3 includes, although not shown, a smoothing processing part, a 1.5-times density converting processing part, an image selector, and a format converting part. The density converting processing part 503-4 selects any density converting mode according to the given setting mentioned above, and carries out a corresponding process on given image data. That is, when the through mode is selected, the given image data is simply made pass through. A corresponding density converting process is carried out on given image data when any one of the respective equal density, 1.5-times density, two-times density, and three-times density modes.

The main/sub-scan trim part 501-5 subsequent to the density converting processing part 501-4 carries out masking processing on given image data. Specific masking amounts for given image data in the main/sub-scan directions are determined according to given set values set in predetermined registers. The masking processing means a process for which corresponding image data are set to be "0", for the purpose that nothing should be printed in page margins of top, bottom, left and right ends of paper.

Figure 27:
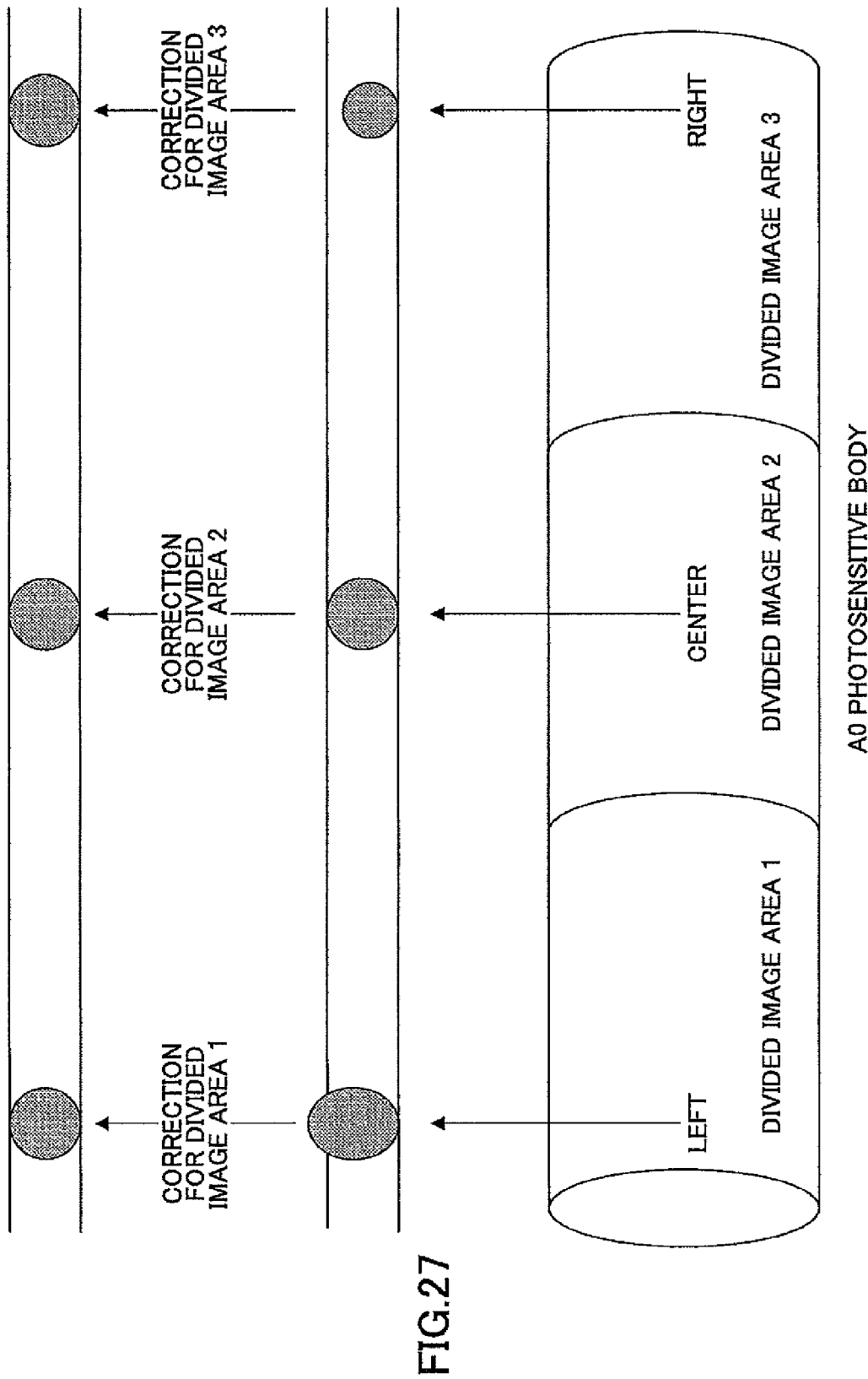
FIG. 27 shows a concept of a state in which correction is carried out for each divided image area.

The embodiment 1 described above has the following advantages:

1) A given image is divided in the main scan direction, and an isolated dot included in an unauthorized copy protection pattern is corrected separately depending on each of the thus-divided image areas. As a result, it is possible to carry out the correction in such a manner that variations in dot sizes caused by a position along the photosensitive body can be effectively reduced. Thereby, it is possible to improve a recognition rate when an unauthorized copy protection pattern superposed on given image data is recognized from an output image. FIG. 27 shows a case where these variations are reduced. As can be seen from FIG. 27, the variations in dot sizes are corrected, depending on a position along a longitudinal direction of the A0-width photosensitive body as shown in FIG. 26. Thus, the dot sizes are made equal to each other throughout the entire length of the photosensitive body, as a result of correction of pixels of an isolated dot included in an unauthorized copy protection pattern being carried out in a manner depending on each particular divided image area.

2) A width of each divided image area when a given image is divided in the main scan direction can be freely set externally. Therefore, it is possible to finely carry out correction of dot size variations caused depending on a position along the photosensitive body. Thereby, it is possible to improve the recognition rate when an unauthorized copy protection pattern is recognized from an output image.

3) The number of divisions when a given image is divided in the main scan direction can be freely set externally. Therefore, it is possible to finely carry out correction of dot size variations caused depending on a position along the photosensitive body. Thereby, it is possible to improve the recognition rate when an unauthorized copy protection pattern is recognized from an output image.

4) The matching patterns used when pattern recognition is carried out with the use of an image matrix generated with the use of the line memories can be freely externally set. The matching patterns are used in the pattern recognition for determining whether a given image matrix includes an isolated dot of an unauthorized copy protection pattern, and also for determining a specific manner of correction depending on a position of a target pixel in the isolated dot by determining where the target pixel is located in the isolated dot. Further, it is possible to carry out unauthorized copy protection pattern correction whether the binary mode or the multi-level mode is used. As a result, it is possible to respond to a case where a dot pattern of an isolated dot included in an unauthorized copy protection pattern to be superposed on given image data is changed.

5) Set values in the output registers used for determining how to correct pixels of an isolated dot of an unauthorized copy protection pattern can be freely set externally. As a result, it is possible to externally adjust how to correct each pixel of the isolated dot included in the unauthorized copy protection pattern. As a further result, it is possible to carry out unauthorized copy protection pattern correction in consideration of possible variations among machines, a possible change in a dot shape due to a change in environment, and so forth.

6) When the image forming apparatus operates in the multi-level mode and has multi-level LPHs, a size of an isolated dot included in an unauthorized copy protection pattern can be controlled as a result of LED devices corresponding to respective pixels included in the isolated dot being controlled in their light emitting amounts.

7) When the image forming apparatus operates in the binary mode and has binary LPHs, the following method may be used. That is, it is assumed that, in an ordinary state, image data is transferred at a predetermined transfer rate x to the LPHs. Then, image data is transferred at m-times of the predetermined transfer rate x, where m denotes a positive integer. As a result, each pixel can be written m times with positions of writing being gradually shifted in the sub-scan direction. Thus, the above-mentioned pseudo multi-level mode method is used. As a result, it is possible to write a pixel in a pseudo multi-level mode method. By using the pseudo multi-level mode method, it is possible to control a size of an isolated dot included in an unauthorized copy protection pattern effectively.

8) It is possible to select a method used for unauthorized copy protection pattern correction, depending on whether the binary mode or the multi-level mode is used. As a result, it is possible to carry out unauthorized copy protection pattern correction in an appropriate manner whether the binary mode or the multi-level mode is used. As a result, it is possible to share a common unauthorized copy protection pattern correcting function among different types of machines of image forming apparatuses.

An image forming apparatus in an embodiment 2 will now be described.

The embodiment 2 is almost the same as the above-described embodiment 1, and thus, differences therebetween will be described. In the embodiment 2, a plurality of LPHs are connected to carry out writing on a photosensitive body for A0-size paper, and variations in dot sizes caused in portions at which adjacent LPHs are connected. Such portions at which the adjacent LPHs are connected are referred to as joint portions. The embodiment 2 has a configuration to avoid a possible degradation in the recognition rate occurring due to the above-mentioned variations in dot sizes in joint portions.

Figure 20:
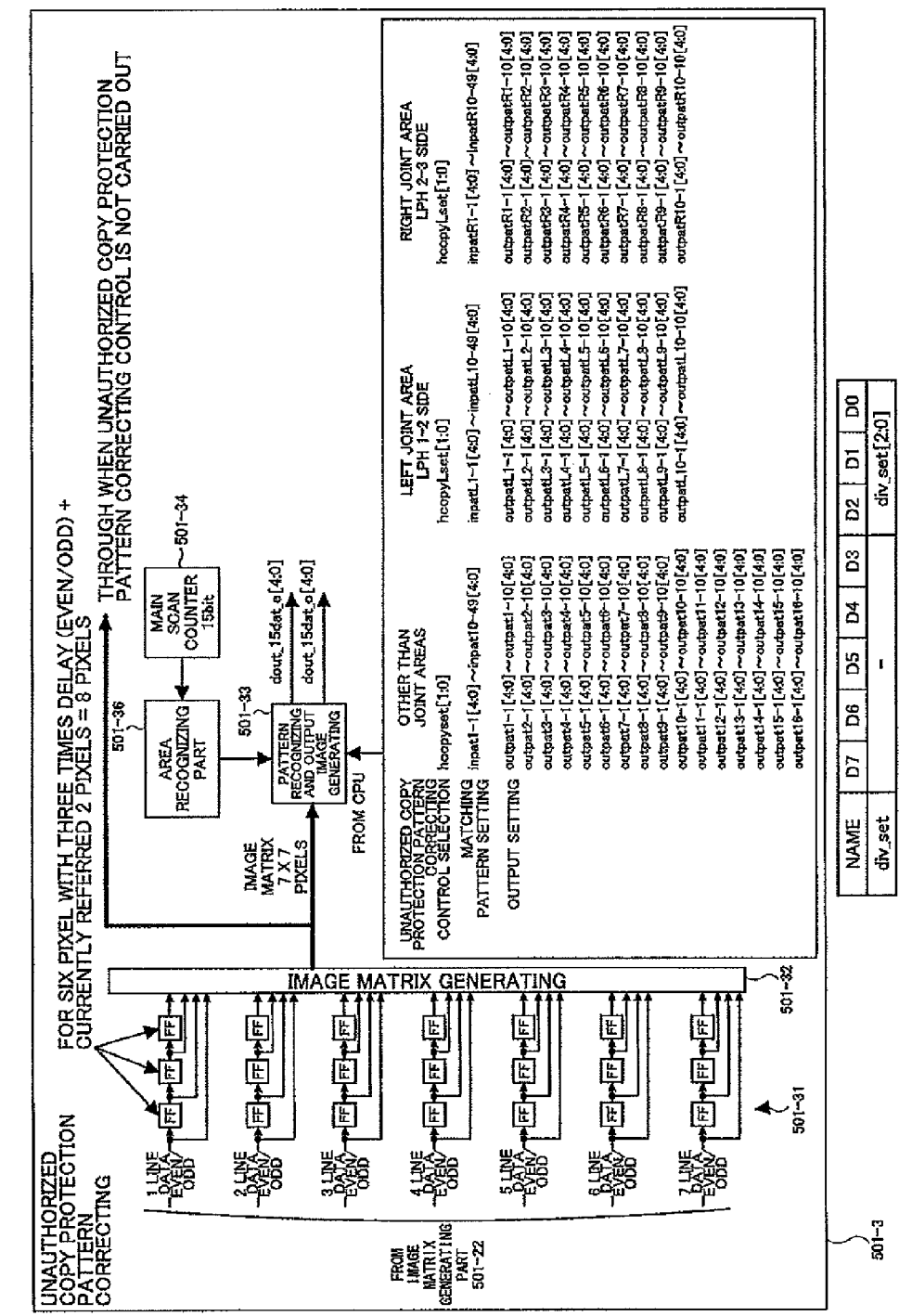
FIG. 20 shows a block diagram in detail of an unauthorized copy protection pattern correcting part in an embodiment 2.

FIG. 20 shows a block diagram of details of an unauthorized copy protection pattern correcting part 501-3 in the embodiment 2. In the embodiment 2, different from the embodiment 1, an area recognizing part 501-36 is provided between the pattern recognizing and output image generating part 501-33 and the main scan counter 501-34.

Figure 21:
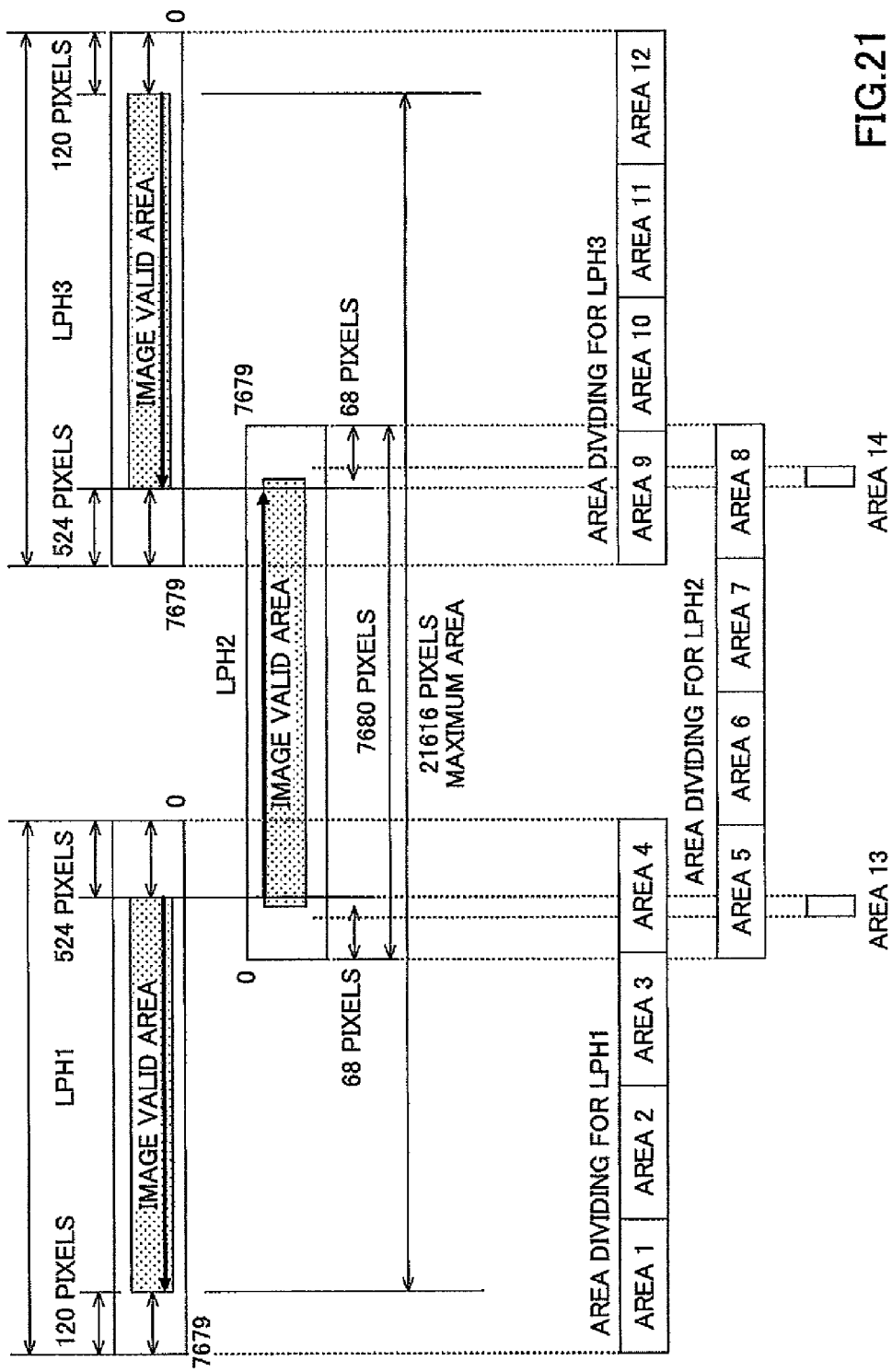
FIG. 21 shows an example in which, in the embodiment 2, a writing area is divided to have LPH1 divided areas, LPH2 divided areas and LPH3 divided areas, a left joint portion area and a right joint portion area.

In the configuration shown in FIG. 20, pattern recognition is carried out in the embodiment 2 as follows:

First, in control of dividing a given image in the main scan direction, the number of divided image areas assigned to each LPH is set in a div_set [2:0] register (for example, realized by the RAM 302-3 of the system control unit 302, which can be freely set externally) shown in a lower part of FIG. 20. Assuming that a range assigned to each LPH of LPHs 501-1, 2 and 3 is 7680 dots as shown in FIG. 21, an area assigned to each LPH is divided every number of pixels obtained from 7680/div_set [2:0]. FIG. 21 shows an example of division in which div_set [2:0]=4.

As shown in FIG. 21, consequently, a given image includes respective divided areas assigned to the LPH1, respective divided areas assigned to the LPH2, respective divided areas assigned to the LPH3, a left joint area (area 13) and a right joint area (area 14).

The area recognizing part 501-36 of the unauthorized copy protection pattern correcting part 501-3 recognizes the above-mentioned joint areas and respective divided image areas as follows: that is, every number of pixels obtained from 7680/div_set [2:0], an area of each one of the LPH1, 2 and 3 (503-1, 2 and 3) is recognized from the value of the main scan counter 501-34, and thus, is divided. As to a last portion of each of the LPH1 503-1 and LPH2 503-2, each joint portion is recognized with reading a designated corresponding address "tunagiL [15:0]" and "tunagiR [15:0] (see FIG. 22, lower part). Consequently, each one of the respective divided image areas (areas 1, 2, 3 and 4) assigned to the LPH1, the respective divided image areas (areas 5, 6, 7 and 8) assigned to the LPH2, the respective divided image areas (areas 9, 10, 11 and 12) assigned to the LPH3, the left joint area 13 and the right joint area 14, are recognized.

Figure 22:
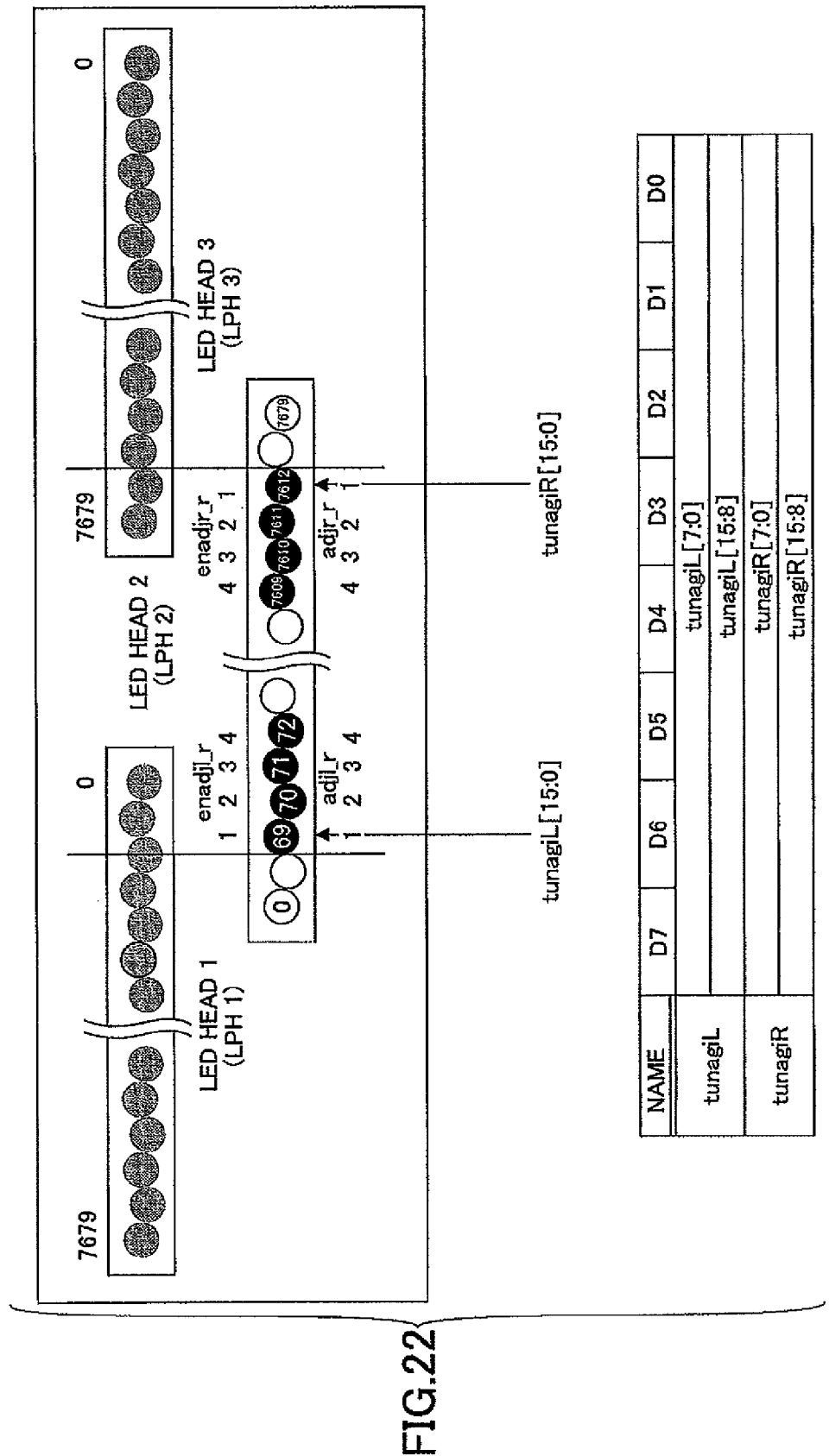
FIG. 22 shows details of the joint portions.
Figure 23:
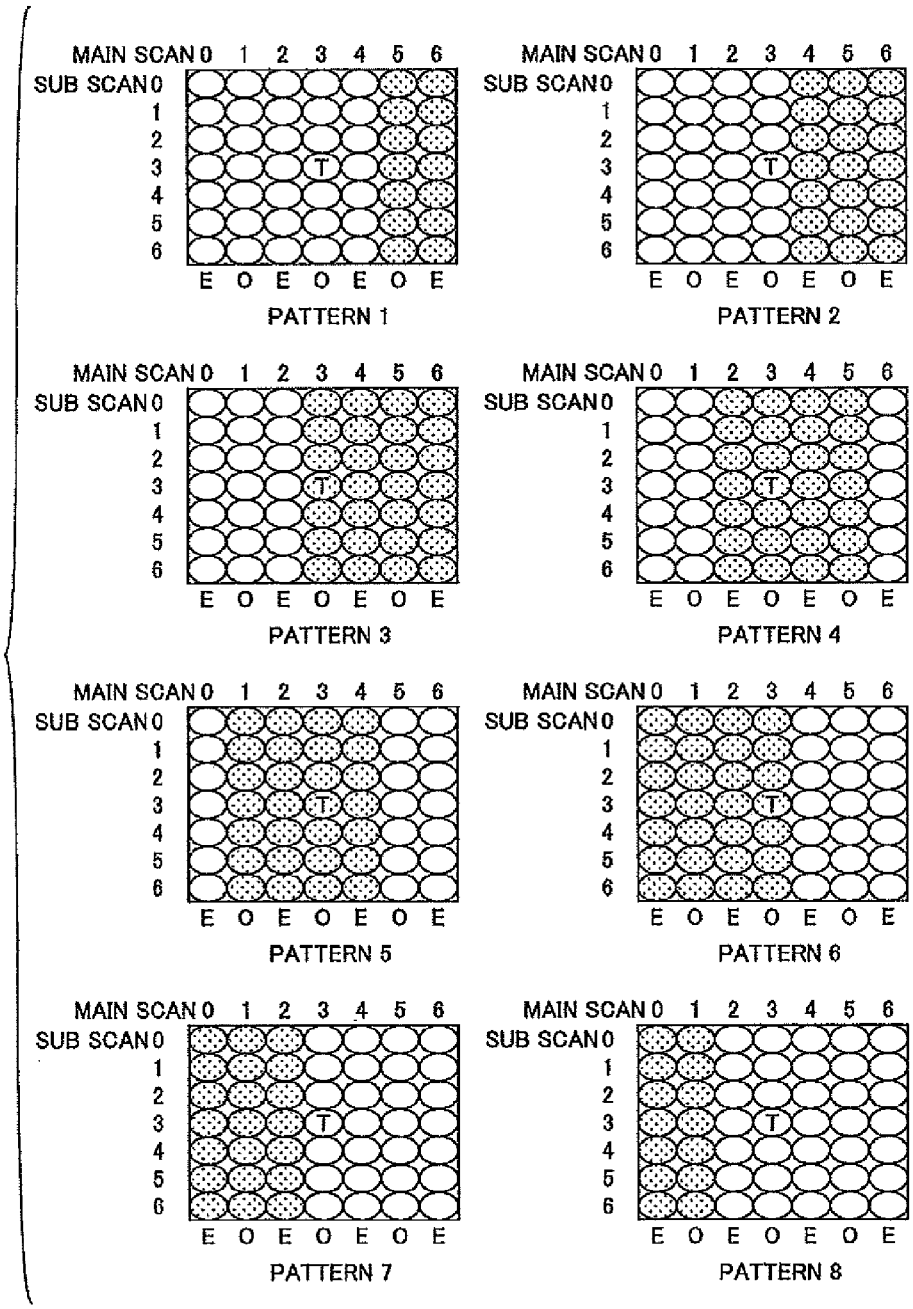
FIG. 23 shows a pattern for pattern matching in the joint portions.

Further, with reference to FIGS. 22 and 23, further details are described now for the joint areas. In the embodiment 2, as shown in FIG. 22, a total of four pixels are recognized as left joint pixels, including a pixel indicated by the register tunagiL [15:0] and subsequent 3 pixels. A total of four pixels are recognized as right joint pixels, including a pixel indicated by the register tunagiR [15:0] and antecedent 3 pixels. Further, as shown in FIG. 23, in the embodiment 2, an area including the left joint pixels and also two pixels each antecedent and subsequent thereto (total 8=4+2+2) is recognized as the left joint area. Similarly, an area including the right joint pixels and further two pixels each antecedent and subsequent thereto is (total 8=4+2+2) recognized as the right joint area.

In FIG. 23, ovals filled with halftone dots represent the left joint pixels or right joint pixels. Pattern 1 shows a state in which, in an image matrix, two columns of the joint pixels are included at a right end part. Similarly, pattern 2 shows a state in which, in an image matrix, three columns of the joint pixels are included at a right end part. That is, the pattern 2 shows a state in which a range of image data extracted as the image matrix is shifted in the main scan direction for one pixel with respect to the pattern 1. Similarly, patterns 3 through 8 of FIG. 23 show a state in which, a range of image data extracted as an image matrix is shifted in the main scan direction for one pixel each in sequence. That is, the patterns 1 through 8 of FIG. 23 show a state in which, from the state in which a target pixel is located in front of the four columns of joint pixels by two pixels (pattern 1), then, the target pixel passes through the four columns of joint pixels (patterns 3 through 6), and, after that, the target pixel has left and goes away from the four columns of joint pixels by second pixels (pattern 8).

In the embodiment 2, pattern recognition is carried out as follows:

First, description is made for the divided image areas other than the joint areas. In pattern recognition, the ten matching patterns set by the registers inpat 1-1 [4:0] through inpat 1-49 [4:0] shown in FIG. 12 are used for a given image matrix, as in the embodiment 1.

As mentioned above, these registers inpat 1-1 [4:0] through inpat 1-49 [4:0] correspond to respective pixels (1 through 49) of an image matrix extracted from image data for a page of an image. In the registers, possible ten patterns of an isolated dot of an unauthorized copy protection pattern are set, in each of which ten patterns, a target pixel is located at the center as mentioned above. With the use of the matching patterns, it is possible to correct only the unauthorized copy protection pattern without influencing a given image on which the unauthorized copy protection pattern is superposed.

A determination as to whether the image matrix matches any one of the matching patterns is carried out by a pattern recognizing and output image generating part 501-32 shown in FIG. 20. From the pattern recognizing and output image generating part 501-32, a corrected pixel value according to which of the matching patterns the image matrix has matched is output. That is, image data in which a size of the isolated dot included in an unauthorized copy protection pattern has been corrected are output instead of the original image data. Such replacement of image data may also be referred to as image data conversion. During image data conversion, a main scan counter 501-34 counts the number of pixels to recognize a target pixel. Thereby, a divided image area to which the target pixel belongs is recognized by the area recognizing part 501-36. Then, when a 7×7 pixel image matrix in which the target pixel is located at the center as mentioned above agrees with any one of the matching patterns set in the registers input 1-1 [4:0] through inpat 1-49 [4:0], a corrected value of the target pixel is output based on a corresponding one of the output registers outpat 1-1 [4:0] through outpat 16-10 [4:0] shown in FIGS. 13-16. The output registers outpat 1-1 [4:0] through outpat 16-10 [4:0] are set separately for each one of the divided image areas, and also, are set separately for each one of the matching patterns.

When the multi-level mode is used, the thus-provided corrected value of the target pixel is converted into a corresponding gradation value, and is transferred to a corresponding LPH. When the binary mode is used, the above-mentioned pseudo multi-level mode method is used, in which sub-scan twice putting is carried out to write a target pixel twice in the sub-scan direction. In this case, image data may have a maximum of 4 values. Image data has a data structure having a large number of bits for preparing for the multi-level mode. In the binary mode, the lowest two bits thereof are used.

Specifically in the binary mode, according to the pseudo multi-level mode method, as shown in FIG. 17, lower part, when a pixel value obtained from the above-mentioned output register is 00, writing is not carried out for two lines of the sub-scan twice putting. When a pixel value obtained from the above-mentioned output register is 01, writing is carried out only for the first line (i.e., a pixel value of the line is 1), and writing is not carried out (i.e., a pixel value of the line is 0) for the second line of the sub-scan twice putting. When a pixel value obtained from the above-mentioned output register is 10, writing is not carried out for the first line (i.e., a pixel value of the line is 0), and writing is carried out (i.e., a pixel value of the line is 1) for the second line of the sub-scan twice putting. When a pixel value obtained from the above-mentioned output register is 11, writing is carried out for each of the first and second lines (i.e., each of the respective pixel values of the lines is 1) of the sub-scan twice putting. Thus, in the binary mode, a corrected target pixel is controlled, corresponding to two pixels thus obtained from the sub-scan twice putting, to replace an original target pixel. As a result, the target pixel included in an isolated dot of an unauthorized copy protection pattern is corrected, and thus, the unauthorized copy protection pattern is appropriately corrected.

Next, pattern recognition for the joint areas is described. In the embodiment 2, as shown in FIG. 22, the three LPHs 503-1 through 503-3 are arranged in a staggered manner. Therefore, when light emitting of the LPH2 is controlled, correction is carried out for the joint areas between the LPH1 and LPH2, and also, between LPH2 and LPH3. First, description is made for the left joint area (area 13).

Pattern recognition of the left joint area is carried out as follows: First, as shown in FIG. 23, there are a possible 8 patterns (patterns 1 through 8 in FIG. 23) from a state (pattern 1) in which a target pixel first enters the left joint area (total 8 [columns]=4 (joint pixels)+2 (antecedent)+2 (subsequent) as mentioned above) through a state (pattern 8) in which the target pixel is going to exit the left joint area. The 8 patterns 1 through 8 of FIG. 23 are different according to where the above-mentioned 4 columns of left joint pixels are located in a 7×7 pixel image matrix. For each of the 8 patterns, settings of the corresponding output registers are carried out separately. That is, as shown in FIGS. 24A and 24B, the settings of the corresponding output registers are carried out separately for the one of the ten matching patterns a given image matrix matches and also, separately for the one of the above-mentioned 8 patterns the left joint area is located in the given image matrix. Accordingly, the settings of the corresponding output registers, i.e., settings for a corrected value of a target pixel is a total of 80(=10×8). These 80 settings correspond to respective 80 output registers outpat L1-1 [4:0] through outpat L8-10 [4:0] shown in FIGS. 24A, 24B.

The right joint area (area 14) has the same situation as that of the left joint area (area 13) described above. That is, the settings of the corresponding output registers are carried out separately for the one of the ten matching patterns a given image matrix matches and also, separately for the one of the above-mentioned 8 patterns the right joint area is located in the given image matrix. Accordingly, the settings of the corresponding output registers, i.e., settings for a corrected value of a target pixel is a total of 80(=10×8). These 80 settings correspond to respective 80 output registers outpat R1-1 [4:0] through outpat R8-10 [4:0] shown in FIGS. 25A, 25B.

Further, as to unauthorized copy protection pattern correction for the left and right joint areas in the embodiment 2, separately from unauthorized copy protection pattern correction for the entirety of a given image, registers hcopyLset and hcopyRset are provided (which may be realized by the RAM 302-3 of the system control unit 302, and may be freely set externally). With the use of these registers, it is possible to select whether unauthorized copy protection pattern correction is carried out, and whether the binary mode or the multi-level mode is used.

Differences between the binary mode and the multi-level modes in an unauthorized copy protection pattern correction method are the same as those described above with reference to FIGS. 18 and 19. That is, in the binary mode shown in FIG. 18, "1" is set in each of the above-mentioned registers inpat 1-25 through 1-27, inpat 1-32 through 1-34, and inpat 1-32 through 1-41, while "0" is set in each of the other registers. In the thus obtained matching pattern, as shown in an upper part of FIG. 18, in a 7×7 pixel image matrix, 25th through 27th, 32nd through 34th, 39th through 41st (see FIG. 12, lower part) are black pixels, while the other pixels are white pixels. The same manner holds in a case of FIG. 19. However, in the case of FIG. 19, because the multi-level mode is used, "1f" is set in each of the above-mentioned registers inpat 1-25 through 1-27, inpat 1-32 through 1-34, and inpat 1-32 through 1-41, while "0" is set in each of the other registers. Settings in the output registers are carried out separately for the one of the divided image areas (including the respective divided image areas assigned to the LPH1 through LPH3, the left joint area and the right joint area) a target pixel belongs to.

Thus, in the embodiment 2 described above, it is possible to control only an unauthorized copy protection pattern superposed on given image data without influencing an image represented by the given image data. Thus, it is possible to effectively control an unauthorized copy protection pattern superposed on given image data, and thus, it is possible that the unauthorized copy protection function positively works well.

According to the embodiment 2, in addition to those of the embodiment 1 described above, the following advantages are provided:

1) When an unauthorized copy protection pattern is superposed on given image data, an A0-size image is divided into divided image areas in consideration of an influence from a position along the photosensitive body and variations in the LPHs. Then, a light emitting amount used for writing each pixel on the photosensitive body is controlled in a separate manner according to which one of the divided image area a target pixel belongs to. Thereby, it is possible to stably print pixels in which a dot diameter of an isolated dot of the unauthorized copy protection pattern is stabilized at any position of the A0 width. Thus, it is possible to improve a recognition rate when the unauthorized copy protection pattern is recognized from an image printed on a printed matter in which the unauthorized copy protection pattern has been superposed on the given image data.

2) When an isolated dot included in an unauthorized copy protection pattern is written on the photosensitive body in the joint areas between the adjacent LPHs, unauthorized copy protection pattern correction is carried out in a manner separate from unauthorized copy protection pattern correction carried out on the other areas. As a result, it is possible to adjust a dot diameter of an isolated dot included in an unauthorized copy protection pattern in the joint areas in a manner separate from unauthorized copy protection pattern correction carried out on the other areas.

3) For an image area designated to each LPH other than the joint areas, the image area is divided in the main scan direction, and unauthorized copy protection pattern correction is carried out in a manner different for each of the respective divided image areas. As a result, it is possible to adjust dot diameters of isolated dots of unauthorized copy protection patterns separately for each one of the divided image areas. These functions are advantageous in particular when an A0-size image is printed.

Figure 28:
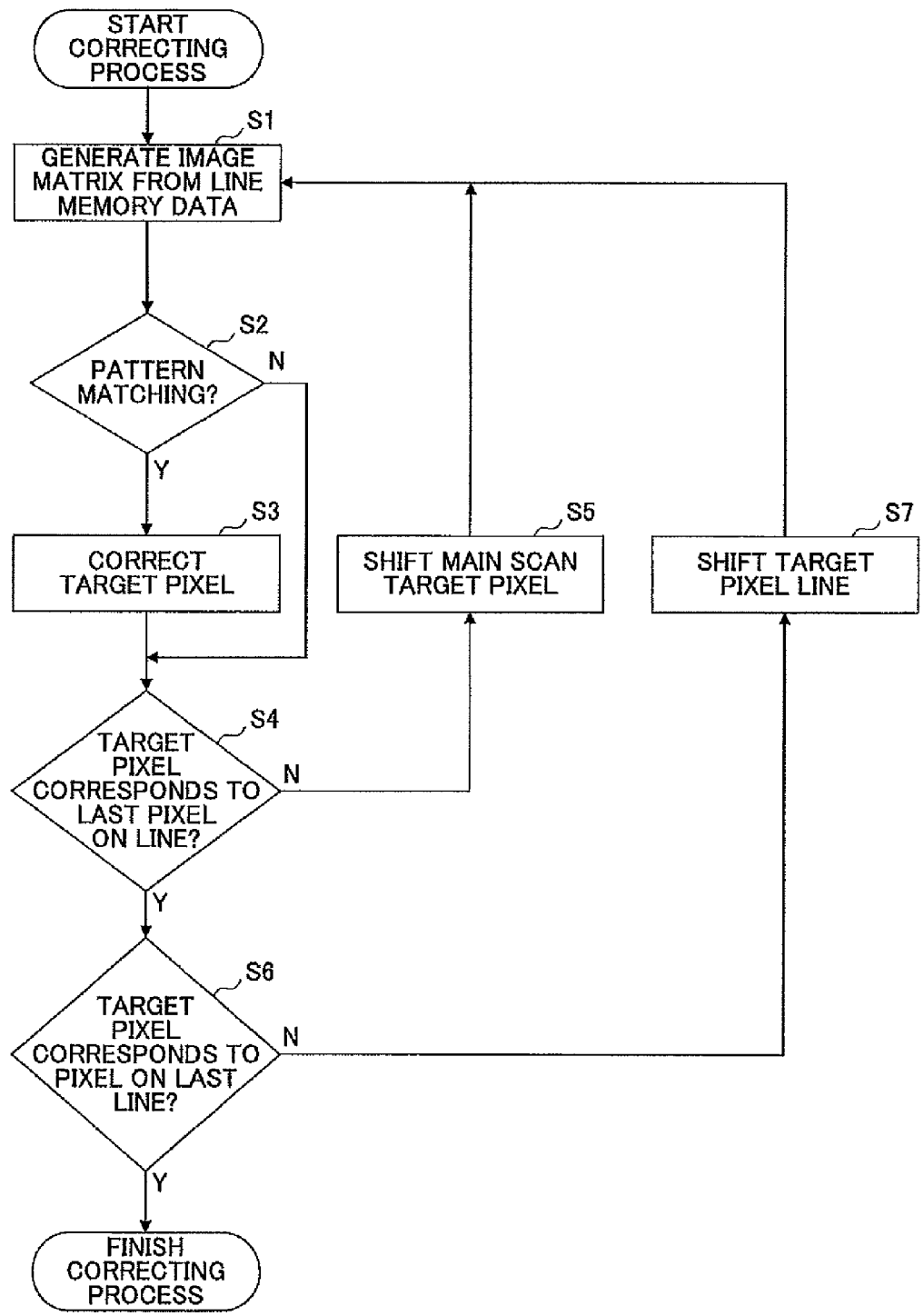
FIG. 28 shows a flowchart illustrating a flow of unauthorized copy protection pattern correcting operation.

FIG. 28 shows a flow chart illustrating a flow of operation of unauthorized copy protection pattern correction which is carried out by the unauthorized copy protection pattern correcting part 501-3 in the embodiment 1 shown in FIG. 8 and so forth, or by the unauthorized copy protection pattern correcting part 501-3 in the embodiment 2 shown in FIG. 20 and so forth.

In FIG. 28, in step S1, the image matrix generating part 501-32 generates an image matrix with the use of image data provided by the line memories 501-21. In step S1, the image matrix is extracted such that a target pixel is located at the center of the image matrix. In step S2, the pattern recognizing and output image generating part 501-33 uses the matching patterns set in the registers, and carries out pattern recognition. When any matching pattern matches the image matrix (YES in step S2), a pixel value of the target pixel is replaced by a corrected value, according to which matching pattern has matched to the image matrix, and which one of the divided image areas and the joint areas the target pixel belongs to. After that, step S4 is carried out. It is noted that, when none of the matching patterns has matched the image matrix (NO in step S2), step S3 is skipped and step S4 is carried out directly.

In step S4, it is determined whether the target pixel is the last one on a line which the target pixel belongs to. When the target pixel is the last one on the line which the target pixel belongs to (YES in step S4), it is determined in step S6 whether the target pixel belongs to the last line. When the target pixel belongs to the last line, the processing is finished.

When the target pixel is not the last pixel on the line (NO in step S4), a next pixel is extracted to be a next target pixel, which is the pixel shifted in the main scan direction by one pixel in step S5. After that, for the thus-extracted new target pixel, the above-mentioned processes starting from step S1 are carried out. When the target pixel does not belong to the last line (NO in step S6), a first pixel on a next line which is a line shifted in the sub-scan direction by one line is extracted to be a next target pixel in step S7. After that, for the thus-extracted new target pixel, the above-mentioned processes starting from step S1 are carried out.

Thus, in the embodiment 1 or 2 of the present invention, an image matrix is extracted, such that a target pixel is located at the center of the image matrix, in sequence. Thereby, the entirety of a page image currently being processed is scanned in the main scan direction and also in the sub-scan direction (steps S5, S7). Then, with the use of the image matrix thus extracted, pattern recognition is carried out (step S2). Thereby, an unauthorized copy protection pattern which is superposed on given image data is detected. Correction is then carried out on the thus-detected unauthorized copy protection pattern in pixel units (step S4).

FIGS. 29 and 30 illustrate an example of such correction of an isolated dot of an unauthorized copy protection pattern. FIG. 29 illustrates a case where the binary mode is used. FIG. 29(a) shows a state in which an isolated dot is printed. The isolated dot is formed by a 3 pixels by 3 pixels, that is, a 3×3 pixel dot, as shown. FIG. 29(b) shows a case where the thus-printed isolated dot satisfies a required standard for unauthorized copy protection patterns. FIG. 29(c) shows a case where the thus-printed isolated dot has a size too large to satisfy the required standard for unauthorized copy protection patterns. It is noted that, in FIG. 29(b) or FIG. 29(c), different from FIG. 29(a), the 3×3 pixel isolated dot is expressed as a circle or an oval. This is because an expressing manner which is convenient for explanation is used (the same manner holding hereinafter).

FIG. 29(d) and FIG. 29(e) illustrate a state in which, in comparison to FIG. 29(a), FIG. 29(b), the above-mentioned unauthorized copy protection pattern correcting part 501-3 has carried out correction. That is, FIG. 29(d) shows a state in which the above-mentioned pseudo multi-level mode method is used, and thus, each pixel shown in FIG. 29(a) is written twice in the sub-scan direction, i.e., the above-mentioned sub-scan twice putting is carried out. Specifically, for example, a top-left pixel of FIG. 29(a) is expressed by two pixels arranged in the sub-scan direction (i.e., the vertical direction on the paper), where the two pixels are corrected to be white pixels, as shown in FIG. 29(d). Similarly, a top-center pixel of FIG. 29(a) is expressed by two pixels arranged in the sub-scan direction, where the two pixels are corrected to one white pixel and one black pixel, as shown in FIG. 29(d). Thus, in the correction, all 9 pixels of the original 3×3 pixel isolated dot are converted into a total of 18 pixels through the above-mentioned sub-scan twice putting. Also, peripheral pixels are corrected to include white pixels, as shown in FIG. 29(a) and FIG. 29(d). As a result, as shown in FIG. 29(e), the isolated dot is apparently reduced in its size. Thus, the isolated dot included in the unauthorized copy protection pattern is adjusted to satisfy the required standard for unauthorized copy protection patterns.

FIG. 30 shows an example of correction of an isolated dot included in an unauthorized copy protection pattern in a case where the multi-level mode is used. FIG. 30 is the same as FIG. 29 except that whether the multi-level mode or the binary mode is used. FIG. 29(a), 29(b), 29(c) and 29(e) correspond to FIG. 30(a), 30(b), 30(c) and 30(e), respectively. Duplicate description will be omitted. It is noted that as shown in FIG. 30(d), the same as FIG. 29(d), the above-mentioned pseudo multi-level mode is used also in this case, through the sub-scan twice putting. As a result, as shown in FIG. 30(d), an original 3×3 pixel isolated dot shown in FIG. 30(a) is converted into a 3×6 pixel dot including total 18 pixels. Because the multi-level mode is used, each of the 18 pixels is controlled in its gradation. Specifically, for example, a top-left pixel of FIG. 30(a) is expressed by two pixels arranged in the sub-scan direction, where the two pixels are corrected to one white pixel and one gray pixel, as shown in FIG. 30(d). Similarly, a top-center pixel of FIG. 30(a) is expressed by two pixels arranged in the sub-scan direction, where the two pixels are corrected to one white pixel and one gray pixel, as shown in FIG. 30(d). Thus, in the correction, all 9 pixels of the original 3×3 pixel isolated dot are converted into a total of 18 pixels through the above-mentioned sub-scan twice putting, and also, peripheral pixels are corrected to include white and gray pixels, as shown in FIG. 30(a) and FIG. 30(d). As a result, as shown in FIG. 30(e), the isolated dot is apparently reduced in its size. Thus, the isolated dot included in the unauthorized copy protection pattern is adjusted to satisfy the required standard for unauthorized copy protection patterns. It is noted that the gray pixel means a pixel having a gradation intermediate between those of a black pixel and a white pixel.

The present invention is not limited to the specifically disclosed embodiments, and variations and modifications may be made without departing from the scope of the present invention.

The present application is based on Japanese priority applications No. 2007-185715 and 2008-179525 filed Jul. 17, 2007 and Jul. 9, 2008, respectively, the entire contents of which are hereby incorporated herein by reference.

What is claimed is:

1. An optical writing apparatus comprising:
a receiving unit configured to receive an input of a second image data which is formed by superposing an unauthorized copy protection pattern on a first image data;
an unauthorized copy protection pattern recognition unit configured to recognize the unauthorized copy protection pattern in the second image data;
a control unit configured to correct image data of the unauthorized copy protection pattern in pixel unit, and control a size of an isolated dot included in the unauthorized copy protection pattern; and
a writing unit configured to write a corresponding image on a photosensitive body based on the thus-corrected image data, wherein
the control unit is configured to correct data in the second image data having the unauthorized copy protection pattern recognized by the unauthorized copy protection pattern recognition unit based on predetermined data according to a standard of the unauthorized copy protection pattern and at least characteristics of the writing unit.

2. The optical writing apparatus as claimed in claim 1, wherein:
said control unit controls to make a correction in a different manner according to a relative position of each pixel included in an isolated dot, for each isolated dot included in the unauthorized copy protection pattern.

3. The optical writing apparatus as claimed in claim 1, wherein:
the control unit divides an image in a main scan direction, and controls a size of an isolated dot included in the unauthorized copy protection pattern separately for each of divided areas.

4. The optical writing apparatus as claimed in claim 3, further comprising:
a setting unit configured to externally set widths of the divided image areas obtained from dividing in the main scan direction.

5. The optical writing apparatus as claimed in claim 3, further comprising:
a setting unit configured to externally set the number of the divided image areas obtained from dividing in the main scan direction.

6. The optical writing apparatus as claimed in claim 1, wherein:
a plurality of light emitting device arrays, each having a width shorter than a length in a main scan direction of paper to which an image written on the photosensitive body is transferred, are arranged in such a manner that the light emitting device arrays overlap each other along the main scan direction, and the control unit controls a size of an isolated dot included in the unauthorized copy protection pattern for an image area of a joint portion between adjacent ones of the light emitting device arrays in a manner different from that for another area.

7. The optical writing apparatus as claimed in claim 6, wherein:
an image area of an image is divided in the main scan direction in a region other than image areas at joint portions, and
said control unit controls a size of an isolated dot for each divided image area separately.

8. The optical writing apparatus as claimed in claim 1, further comprising:
a setting unit configured to set externally a reference pixel pattern used for recognizing an isolated dot included in the unauthorized copy protection pattern.

9. The optical writing apparatus as claimed in claim 1, further comprising:
an adjusting unit configured to adjust a manner of correcting each pixel included in an isolated dot included in the unauthorized copy protection pattern.

10. The optical writing apparatus as claimed in claim 9, wherein:
the adjusting unit comprises an output control unit configured to control output of a light emitting device corresponding to each pixel included in the isolated dot.

11. The optical writing apparatus as claimed in claim 9, the adjusting unit comprises a transfer rate control unit configured to control a transfer rate of image data to a light emitting device corresponding to each pixel included in the isolated dot.

12. The optical writing apparatus as claimed in claim 9, comprising:
an output control unit configured to control output of a light emitting device corresponding to each pixel included in the isolated dot;
a transfer rate control unit configured to control a transfer rate of image data to a light emitting device corresponding to each pixel included in the isolated dot; and
a selecting unit configured to select either one of the output control unit and the transfer rate control unit, wherein:
said selecting unit selects either one of the output control unit and the transfer rate control unit depending on whether a binary mode or a multi-level mode is used; and
the adjusting is carried out with the use of one of the output control unit and the transfer rate control unit, selected by the selecting unit.

13. An image forming apparatus comprising:
the optical writing apparatus claimed in claim 1; and
a transferring unit configured to transfer the image written on the photosensitive body by the optical writing apparatus onto paper.

14. The optical writing apparatus as claimed in claim 1, wherein:
said control unit controls to make a correction in a different manner according to a relative position of each pixel included in an isolated dot, for each isolated dot included in the unauthorized copy protection pattern, and
the correction is made to the pixel included in the isolated dot in the unauthorized copy protection pattern, said pixel being located at a center of the pixel unit.

15. A non-transitory computer readable information recording medium storing a program which, when executed by one or more processors, controlling a writing apparatus configured to write, based on image data, a corresponding image on a photosensitive body, carries out the steps of:
receiving an input of a second image data which is formed by superposing an unauthorized copy protection pattern on a first image data;
recognizing an unauthorized copy protection pattern in the second image data;
correct image data of the unauthorized copy protection pattern in pixel unit, and controlling a size of an isolated dot included in the unauthorized copy protection pattern, wherein data in the second image data having the unauthorized copy protection pattern recognized by an unauthorized copy protection pattern recognition unit is corrected based on predetermined data according to a standard of the unauthorized copy protection pattern and at least characteristics of the writing apparatus.

16. The non-transitory computer readable information recording medium as claimed in claim 15, wherein:
said program controls the writing apparatus to control to make a correction in a different manner according to a relative position of each pixel included in an isolated dot, for each isolated dot included in the unauthorized copy protection pattern.

17. The non-transitory computer readable information recording medium as claimed in claim 15, wherein:
said program controls the writing apparatus to divide an image in a main scan direction, and controls a size of an isolated dot included in the unauthorized copy protection pattern separately for each of divided areas.

18. The non-transitory computer readable information recording medium as claimed in claim 15, wherein:
said program controls the writing apparatus to adjust a manner of correcting each pixel included in an isolated dot included in the unauthorized copy protection pattern.

19. The non-transitory computer readable information recording medium as claimed in claim 18, wherein:
said program controls the writing apparatus to control output of a light emitting device corresponding to each pixel included in the isolated dot.

20. The non-transitory computer readable information recording medium as claimed in claim 18, wherein:
said program controls the writing apparatus to control a transfer rate of image data to a light emitting device corresponding to each pixel included in the isolated dot.

21. The non-transitory computer readable information recording medium as claimed in claim 18, wherein:
said program controls the writing apparatus to carry out the steps of:
a) controlling output of a light emitting device corresponding to each pixel included in the isolated dot;
b) controlling a transfer rate of image data to a light emitting device corresponding to each pixel included in the isolated dot; and
c) selecting either one of said step a) and said step b), wherein:
said step c) selects either one of said step a) and said step b) depending on whether a binary mode or a multi-level mode is used; and said program controls the writing apparatus to carry out the step of adjusting a manner of correcting each pixel included in an isolated dot included in the unauthorized copy protection pattern, with the use of one of said step a) and said step b), selected by said step c).

* * * * *